US012665996B2

(12) United States Patent
Presler

(10) Patent No.: US 12,665,996 B2
(45) Date of Patent: Jun. 23, 2026

(54) DIGITAL CINEMA CAMERA SYSTEM FOR RECORDING, EDITING AND VISUALIZING IMAGES

(71) Applicant: SILICON IMAGING CORPORATION, Delray Beach, FL (US)

(72) Inventor: Ari M. Presler, Delray Beach, FL (US)

(73) Assignee: Silicon Imaging Corporation, Delray Beach, FL (US)

( * ) Notice: Subject to any disclaimer, the term of this patent is extended or adjusted under 35 U.S.C. 154(b) by 98 days.

(21) Appl. No.: 18/890,754

(22) Filed: Sep. 20, 2024

(65) Prior Publication Data

US 2025/0016297 A1     Jan. 9, 2025

Related U.S. Application Data

(63) Continuation of application No. 17/543,631, filed on Dec. 6, 2021, now Pat. No. 12,108,018, which is a
(Continued)

(51) Int. Cl.
H04N 13/189          (2018.01)
G03B 17/56           (2021.01)
(Continued)

(52) U.S. Cl.
CPC .......... H04N 13/189 (2018.05); G03B 17/56 (2013.01); H04N 5/772 (2013.01); H04N 13/161 (2018.05);
(Continued)

(58) Field of Classification Search
CPC .. H04N 13/189; H04N 13/204; H04N 13/257;

H04N 13/194; H04N 13/239; H04N 13/161; H04N 13/275; H04N 23/661; H04N 23/695; H04N 25/745; H04N 23/633; H04N 23/52; H04N 23/631; H04N 23/95; H04N 5/772; H04N 5/765; H04N 5/781;
(Continued)

(56) References Cited

U.S. PATENT DOCUMENTS

| | | | |
|---|---|---|---|
| 3,295,425 A | 1/1967 | Bing et al. | |
| 3,927,269 A | 12/1975 | Yoshino et al. | |
| | (Continued) | | |

FOREIGN PATENT DOCUMENTS

| | | |
|---|---|---|
| JP | 2002223385 A | 8/2002 |
| JP | 2007096412 | 12/2007 |
| WO | WO-9509510 A1 | 4/1995 |

OTHER PUBLICATIONS

Silicon Imaging, Silicon Imaging S1-1920HD MegaCamera 1080P/ 24/30/60 12-bit High-Definition Camera, 2004 XP002682243, whole document.
(Continued)

*Primary Examiner* — Lin Ye
*Assistant Examiner* — Fayez A Bhuiyan
(74) *Attorney, Agent, or Firm* — Calyx Law LLP; Matthew Spark

(57) ABSTRACT

A digital camera system includes an optical assembly to gather light from a desired scene, a modular imaging subsystem aligned with the optical assembly, and an image processing, recording and display subsystem.

108 Claims, 12 Drawing Sheets

Related U.S. Application Data continuation of application No. 16/712,769, filed on Dec. 12, 2019, now Pat. No. 11,196,978, which is a continuation of application No. 15/425,935, filed on Feb. 6, 2017, now Pat. No. 10,511,825, which is a continuation of application No. 12/595,811, filed as application No. PCT/US2008/060272 on Apr. 14, 2008, now Pat. No. 9,565,419.

(60) Provisional application No. 60/923,339, filed on Apr. 13, 2007.

(51) Int. Cl.

| | |
|---|---|
| H04N 5/77 | (2006.01) |
| H04N 13/161 | (2018.01) |
| H04N 13/194 | (2018.01) |
| H04N 13/204 | (2018.01) |
| H04N 13/239 | (2018.01) |
| H04N 13/257 | (2018.01) |
| H04N 13/275 | (2018.01) |
| H04N 23/52 | (2023.01) |
| H04N 23/63 | (2023.01) |
| H04N 23/661 | (2023.01) |
| H04N 23/695 | (2023.01) |
| H04N 23/95 | (2023.01) |
| H04N 25/71 | (2023.01) |
| H04N 5/765 | (2006.01) |
| H04N 5/781 | (2006.01) |
| H04N 5/85 | (2006.01) |
| H04N 5/907 | (2006.01) |
| H04N 9/79 | (2006.01) |
| H04N 9/804 | (2006.01) |

(52) U.S. Cl.
CPC ......... *H04N 13/194* (2018.05); *H04N 13/204* (2018.05); *H04N 13/239* (2018.05); *H04N 13/257* (2018.05); *H04N 13/275* (2018.05); *H04N 23/52* (2023.01); *H04N 23/631* (2023.01); *H04N 23/633* (2023.01); *H04N 23/661* (2023.01); *H04N 23/695* (2023.01); *H04N 23/95* (2023.01); *H04N 25/745* (2023.01); *H04N 5/765* (2013.01); *H04N 5/781* (2013.01); *H04N 5/85* (2013.01); *H04N 5/907* (2013.01); *H04N 9/7921* (2013.01); *H04N 9/804* (2013.01)

(58) Field of Classification Search
CPC ........ H04N 5/85; H04N 5/907; H04N 9/7921; H04N 9/804; G03B 17/56
See application file for complete search history.

(56) References Cited

U.S. PATENT DOCUMENTS

| | | | |
|---|---|---|---|
| 4,281,909 A | 8/1981 | Ishibashi et al. | |
| 4,667,226 A | 5/1987 | Glenn | |
| 5,221,964 A | 6/1993 | Chamberlain et al. | |
| 6,198,505 B1 | 3/2001 | Turner et al. | |
| 6,788,338 B1 | 9/2004 | Dinev et al. | |
| 6,829,391 B2 | 12/2004 | Comaniciu et al. | |
| 7,113,203 B1 | 9/2006 | Wu et al. | |
| 7,738,008 B1 | 6/2010 | Ball | |
| 8,358,357 B2 * | 1/2013 | Jannard | H04N 23/843 |
| | | | 375/240.2 |
| 2003/0193571 A1 | 10/2003 | Schultz et al. | |
| 2004/0198101 A1 | 10/2004 | Rapp | |
| 2004/0218099 A1 | 11/2004 | Washington | |
| 2005/0169532 A1 | 8/2005 | Yamana et al. | |
| 2005/0212970 A1 | 9/2005 | Joskin | |
| 2006/0072835 A1 | 4/2006 | Zhu et al. | |
| 2006/0164533 A1 | 7/2006 | Hsieh et al. | |
| 2006/0176951 A1 | 8/2006 | Berman et al. | |
| 2006/0233236 A1 | 10/2006 | Labrozzi et al. | |
| 2007/0286103 A1 | 12/2007 | Niu et al. | |
| 2008/0198920 A1 | 8/2008 | Yang et al. | |
| 2008/0231630 A1 | 9/2008 | Shenkar et al. | |
| 2009/0115901 A1 | 5/2009 | Winter et al. | |

OTHER PUBLICATIONS

Debra Kaufman, "Arri Unveils D-20 Digital Film-Style Camera Prototype", Feb. 2004, American Cinematographer, pp. 91-94.
EP08745798 2 Extended Search Report dated Sep. 4, 2012.
Silicon Imaging, "Silicon Imaging and P+S Technik Launch Strategic Partnership to Deliver Modular SI-2K Digital Cinema Cameras", Silicon Imaging Press Release, 2002.
Webpage document; Red One Camera, 2012.
Arnold & Richter Cinetechnik, Arriflex D-20 Brochures, Sep. 1, 2004.

* cited by examiner

SILICONDVR SOFTWARE DIAGRAM

DIGITAL CINEMA CAMERA SYSTEM FOR RECORDING, EDITING AND VISUALIZING IMAGES

CROSS-REFERENCE TO RELATED APPLICATION(S)

This application is a continuation of, and claims priority from and the benefit of the following applications: U.S. Non-Provisional application Ser. No. 17/543,631, filed Dec. 6, 2021, which is a continuation of U.S. Non-Provisional application Ser. No. 16/712,769, filed Dec. 12, 2019, issued as U.S. Pat. No. 11,196,978 on Dec. 7, 2021, which is a continuation of U.S. Non-Provisional application Ser. No. 15/425,935, filed Feb. 6, 2017, issued as U.S. Pat. No. 10,511,825 on Dec. 17, 2019, which is a continuation of U.S. Non-Provisional application Ser. No. 12/595,811, filed Oct. 13, 2009, issued as U.S. Pat. No. 9,565,419 on Feb. 7, 2017, which is the U.S. National Stage Entry of PCT Application No. PCT/US08/60272, International Filing Date Apr. 14, 2008, now expired, which claims the benefit of U.S. Provisional Application Ser. No. 60/923,339, filed Apr. 13, 2007, now expired, the entire content of which are incorporated herein by reference.

FIELD OF THE INVENTION

The present invention is related, in general, to a digital cinema camera system. More particularly, the present invention is related to a digital cinema camera system for recording, editing and visualizing images.

BACKGROUND OF THE INVENTION

For many years, film cameras were the only option for capturing cinema quality motion pictures. The time requirements and costs related to shooting and processing motion picture images on film stock and then transferring those images into a digital form have created a need for motion picture cameras that capture high definition or cinema resolution imagery directly in a digital form. The advent of Digital Cinemas, cost effective Stereo 3D Digital cinema projection systems and establishment of Digital Cinema Initiative SMPTE Standards has fueled the need for more content creation for delivery at 2K, 4K and Stereo formats.

Accordingly, there is a need for a digital camera system that meets the needs described above that reduces costs. There is also a need for a digital camera system that leverages digital processing and visualization tools. There is a further need for a digital camera system that provides user feedback and metadata collection when shooting special effects, compositions and stereo or multi-camera content. There is an additional need for a digital camera system that improves flexibility in networked collaboration, enables separated imaging block and recording, has a simple workflow with metadata management and, importantly, maintains film-like reproduction qualities and camera operation. There is also a need for a digital camera system that not only provides the capabilities described above but can also utilize existing cabling infrastructure, broadcast signal monitoring and transmission systems. There is a need for a digital camera system that mixes broadcast standard digital sources into a recording and visualization system, as well as generate broadcast standard and network streaming outputs for 2D and 3D content.

In the past few years, while several digital cinema cameras have emerged on the market these digital cinema cameras are complex designs with limited connectivity that are only able to address a limited set of the needs described above. For example, these digital cinema cameras are incompatible with existing cable infrastructure. Also, these digital cinema cameras either completely lack network management or are capable of only minimal network management (i.e., only simple controls that lack full image streaming or metadata management). Further, these digital cinema cameras lack the ability to capture or record multi-sensor 2K or 4K image data using a single control application. Additionally, these digital cinema cameras lack visualization tools or metadata integration. These digital cinema cameras do not utilize existing broadcast infrastructure to transmit multi-resolution data and have complex workflows with respect to stereo 3D and multi-camera content acquisition, broadcast and network transmission either live or in a post-production process. These digital cinema cameras are limited to 1920×1080 image sensor pixel arrays that require the use of a multiple sensor prism block which, in turn, requires use of complex and expensive optics. These digital cinema cameras utilize dedicated hardware functions with no or limited image processing flexibility or upgrade capability. Dedicated hardware functions utilized by these digital cinema cameras include video processing to perform non-reversible color space transformations or sub-sampling to formats, such as YUV 4:2:2 and 4:4:4, as standard broadcast signals. These digital cinema cameras implement a variety of proprietary compression and coding schemes that introduce visible image artifacts, especially when projected on large screens. While a number of these digital cinema cameras can generate preview imagery for display on an electronic viewfinder, these digital cinema cameras can only do so with limited resolution or visualization tools. High-resolution outputs from these digital cinema cameras are restricted to transmission in SMPTE standard resolution and formats. These digital cinema cameras often output imagery to be record on restrictive, proprietary or large external storage devices. These storage devices include a tape storage system having only linear data access, Non-Volatile Flash or RAM drives with limited storage, and multiple hard disk drive RAID storage systems which are often non-portable and whose media cannot be easily removed or transported for direct use in other systems. Also, the files stored on these storage devices have limited color correction, image processing or post-production metadata integration.

In recent years, many digital still cameras or dual-mode video and still camcorders have also been developed which use single image sensors with color filter arrays. These digital still cameras and camcorder devices do use higher resolution sensors (e.g., HD (1920×1080) camcorders, digital single-lens reflex camera (DSLR) are now 10MP and higher). However, these digital still cameras and camcorders have slow readout architectures (e.g., a DSLR may only shoot four (4) frames per second) and can only achieve video rate preview at low resolution (e.g., 640×480) or standard definition (e.g., VGA 640×480 at thirty (30) frames per second) using sub-sampling or windowing techniques. These digital still cameras and camcorders use dedicated hardware functions or targeted function digital signal processors (DSP) to perform image processing to interpolate and colorize the raw image data from the image sensor. These digital still cameras and camcorders compress the colorized images for storage; but the compressing process performed by these devices prevents access to the original full raw image pixel data for later processing, analysis or colorization. In addition, the interpolation and color processing applied to the source raw data in those devices initially generates data sets that are larger than the source raw data which, in turn, requires the application of higher compression to fit the data sets into a target storage capacity. This typically results in a reduction in image quality compared to the original image or a coded version of the raw data.

A few single sensor cameras have been developed for use in 2K and 4K acquisitions in raw format. However, these cameras use dedicated hardware or targeted function DSPs to perform image processing to interpolate, colorize and display preview quality output and simultaneously compress the raw sensor image data for later digital editing and grading. Also, the compression method and metadata employed by these cameras foreclose the dynamic retrieval of alternative resolution or representations at different bit rates during recording for network streaming, remote grading or adaptive editing. Due to their architectures, these single sensor cameras must apply high compression to fit data into target internal storage capacity devices. Also, due to their architectures, these single sensor cameras lack the ability to transmit the imager raw content over existing broadcast or network infrastructure cabling for remote monitoring, networking, recording or visualization. These single sensor cameras cannot process captured signals with prerecorded content or broadcast format signals for live composition, switching, grading, mixing into virtual sets or adding graphic overlays based on extracted metadata or analytics. These single sensor cameras also lack the ability to manage, control or record multi-sensor imagers, which may be remotely connected to a recording system.

In recent years, there has been an interest in producing digital cinema quality 3D stereographic, wide-dynamic and immersive content using multiple imagers. This has created a need for more efficient modular and scalable cameras and workflow solutions. There is a further need for a digital camera system having a precise synchronization mechanism to enable images to be mixed or stitched without motion artifacts. While digital camera systems have been used to produce this type of content, these camera systems suffer from the same system limitations as the cameras described above. These camera systems are mostly comprised of stand-alone cameras, each with individual controls, viewing and recording systems, with no integration mechanism other than a common sync signal (i.e., there is no communication between camera controls or viewing and recording settings). These camera systems are large and bulky such that the camera systems cannot be placed very close together physically, as is required for short inter-ocular distances in 3D stereographic or for creating hemispherical views where cameras need to be placed as close together as possible from a common center point. When shooting thru mirrors and beam splitters, rigs (i.e., a combination of digital cameras, optics and mounting platform) become more cumbersome and difficult to use in handheld shooting environments. Finally, these camera systems lack a comprehensive set of image processing, visualization, positioning control, recording, playback, communications and display tools for use in such high-definition multi-camera systems.

SUMMARY OF THE INVENTION

The present invention as described herein discloses a digital camera system that captures scalable resolution, bit-depth and frame rate raw or color processed images from one or more modular imaging modules at precise film or video rates, can utilize industry standard cabling infrastructure for transmitting either the raw sensor data or processed raw on the same or different links, provides a mechanism for timing synchronization of exposure and readout cycles from multiple imaging modules, uses a unified software or operator interface to control the capture, processing and nondestructive visualization from one or more imaging modules, can optionally combine the live imagery with previously stored imagery or computer generated virtual sets and simultaneously record the raw, broadcast format, or visualization processed imagery in its original or near original representation. The processor can be used to compress the imagery with an encoder, which can generate multiple streams one for the purpose of recording at highest quality and optionally additional streams at lower data rates for remote transmission. It enables the recording of one or multiple image streams using a common removable storage device or across multiple devices for increased throughput. The recording can make use of a single file containing the streams from multiple imaging modules with metadata to enable the selective playback of one or more streams. The output processing can include mixing the imagery from the multiple streams for display on standard computer or broadcast monitoring devices or processed for output on specialized stereographic displays that require formatting and synchronization from dual image streams. Utilizing metadata encoded in the recorded stream or generated thru user input during playback the relative position, color transformation and format of the dual streams, representing the left and right eye content, can be adjusted to change the stereographic effect and depth perception on these displays.

This invention enables reduced complexity for capturing imagery from one or more image modules, enables remote image sensing and frame grabbing with transmission using existing industry standard broadcast and networking infrastructure, improves storage and processing efficiency, provides increased flexibility and tools visualization, networking, analysis and mixing of prerecorded or computer generated data, and delivers unique display modes 2D and 3D representation of the multiple streams during live, recording, playback or post processing. The disclosed digital camera system may include optics, one or more imaging modules, a frame grabber, a processor, software, user input mechanism, a display, synchronization mechanism, networking means and storage means. In addition, a configuration is disclosed for a portable digital camera and recording system capable of HD, 2K and 4K stereo-3D or wide-dynamic multi-image acquisition using two image sensing modules and separated image processing, recording and display subsystem.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. Throughout the drawings like reference numbers indicate like exemplary elements, components, or steps. In such drawings.

Figure 1:
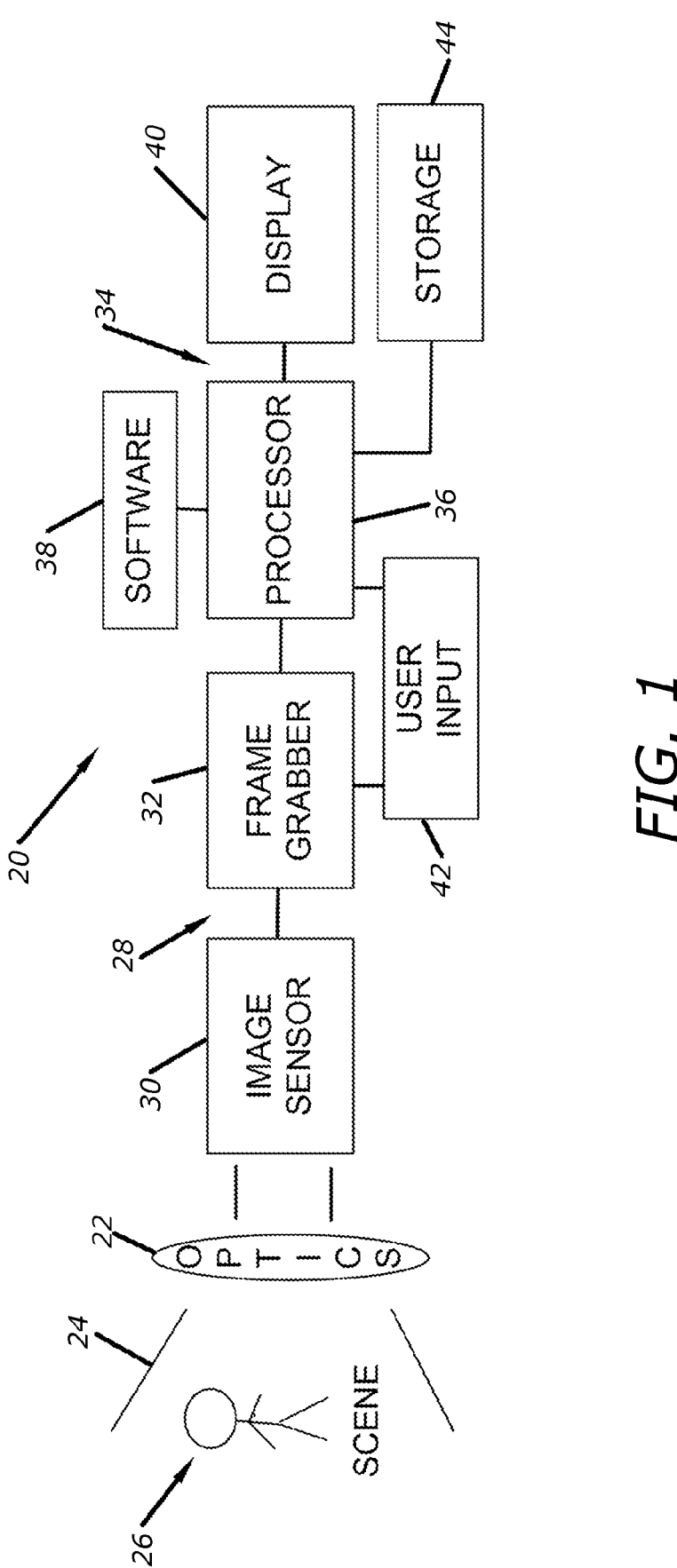
FIG. 1 is a block diagram of a digital camera system embodying the present invention.

DETAILED DESCRIPTION OF THE
PREFERRED EMBODIMENTS

As shown in FIGS. 1-12 for purposes of illustration, the present invention resides in a digital camera system that captures scalable resolution, bit-depth and frame rate raw or color processed images from one or more modular imaging modules at precise film or video rates. The present invention utilizes industry standard cabling infrastructure for transmitting either the raw sensor data or processed raw on the same or different links. The present invention provides a mechanism for timing synchronization of exposure and readout cycles from multiple imaging modules. The present invention also provides a unified software or operator interface to control the capture, processing and non-destructive visualization from one or more imaging modules. The present invention can optionally combine live imagery with previously stored imagery or computer generated virtual sets, while simultaneously recording the raw, broadcast format, or visualization processed imagery in its original or near original representation. The present invention discloses a processor that can be used to compress the imagery with an encoder, which can generate multiple streams one for the purpose of recording at highest quality and optionally additional streams at lower data rates for remote transmission. The present invention enables the recording of one or multiple image streams using a common removable storage device or across multiple devices for increased throughput. The recording can make use of a single file containing the streams from multiple imaging modules with metadata to enable the selective playback of one or more streams. The output processing can include mixing the imagery from the multiple streams for display on standard computer or broadcast monitoring devices or processed for output on specialized stereographic displays that require formatting and synchronization from dual image streams. Utilizing metadata encoded in the recorded stream or generated thru user input during playback the relative position, color transformation and format of the dual streams, representing the left and right eye content, can be adjusted to change the stereographic effect and depth perception on these displays.

The present invention enables reduced complexity for capturing imagery from one or more image modules, enables remote image sensing and frame grabbing with transmission using existing industry standard broadcast and networking infrastructure, improves storage and processing efficiency, provides increased flexibility and tools visualization, networking, analysis and mixing of prerecorded or computer generated data, and delivers unique display modes 2D and 3D representation of the multiple streams during live, recording, playback or post processing. The present invention discloses a digital camera system that includes optics, one or more imaging modules, a frame grabber, a processor, software, user input mechanism, a display, synchronization mechanism, networking means and storage means. In addition, a configuration is disclosed for a portable digital camera and recording system capable of HD, 2K and 4K stereo-3D or wide-dynamic multi-image acquisition using two image sensing modules and separated image processing, recording and display subsystem.

An embodiment of the present invention in the form of a digital camera system 20 is illustrated in FIG. 1 and described below in order to provide an overview of the camera system 20 as well as various components of the system 20 and their respective functions. The camera system 20 includes an optical assembly 22 to gather light 24 from a desired scene 26. The system 20 also includes a modular imaging subsystem 28 aligned with the optical assembly 22 to receive light 24 gathered and/or modified by the optical assembly 22. The modular imaging subsystem 28 comprises one or more imagers 30 and at least one frame grabber 32. The imager 30 captures high definition raw images at film or video rates for HD, 2K and 4K, cinema quality production. The imager 30 can come in various forms including, without limitation, at least one pixilated image sensor unit having one or more arrays of pixels, a pickup tube, a semiconductor detector or the like. The pixilated image sensor unit can come in various forms including, without limitation, a complimentary metal-oxide semiconductor (CMOS) active-pixel image sensor, a metal-oxide semiconductor (MOS) active-pixel image sensor, a charge-coupled device (CCD), a contact image sensor (CIS) or other pixilated detection devices. A single image sensor 30 may include color filters that are used to capture a representation of the full color images.

The optical assembly 22 includes optics (e.g., lenses). The system 20 includes a lens mount (not shown) that interconnects the optical assembly 22 and the modular imaging subsystem 28. The lens mount can come in various forms including, without limitation, a fixed optical interface mount, an interchangeable lens optical interface mounting system or the like. Thus, the lens mount can provide for film or video lenses to be removably connected to the modular imaging subsystem 28. The interchangeable lens mount is a precise mounting surface and locking mechanism, which enables field exchange of the lens mount to support the use of a variety of industry standard lenses such as, PL, Nikon-F, Panavision, Leica, C and Canon. An interchange lens mount with an integrated optic enables the use of B4 optics (originally designed for use with three-sensor prism cameras) on a single-sensor based camera unit. In the alternative, the image sensor unit may have an integrated lens.

The image sensor unit 30 includes a plurality of adjustment mechanisms (not shown) to adjust the position of the image sensor unit relative to the optical center of lens projection and/or to adjust the co-planarity of a sensing plate (i.e., the surface which holds the sensor circuit board of the image sensor) relative to the optical interface mount. The image sensor unit 30 also includes a mechanism for back focus adjustment. Any of the adjustment mechanisms can include an electronic positioning device for remote operation for moving the sensor(s), optics, camera(s) or rig(s). In the alternative, the image sensor unit 30 may be integrated with an optical beam splitter or rotating shutter mechanism to enable the use of an optical viewfinder while continuing to acquire imagery. In another alternative, an electronic display unit can be mounted into the optical beam splitter mechanism to enable selectable operation as an optical or electronic viewfinder or as a combination optical viewfinder with virtual electronic image display.

An optical device (not shown), such as an RGB prism, may be positioned in front of the optical assembly 22 so that a plurality of pixilated sensor units 30 in the imaging subsystem 28 capture color-separated channels. Alternatively, a plurality of pixilated image sensor units 30 and beam splitting optics may also be used to capture a wide dynamic range representation of light 24 from the scene 26, where each pixilated image sensor unit 30 captures a range of scene intensity (i.e., each sensor will have a bounded range of intensity that the sensor can accurately detect or measure based on the capacity of sensitivity and setting of the camera and its sensor (e.g., one cannot typically see details of both the Moon and the Sun in the same scene)). Signals from each of the plurality of image sensor units 30 can be processed and combined into a single image representing a wider range of scene intensity than can be accomplished with a single image sensor unit 30. Each image sensor unit 30 is capable of outputting multiple readouts from the at least one array of pixels with varying integration times for each pixel of the array during a single frame time, to be later combined to achieve a wide dynamic representation of light 24 from the scene 26. The multiple exposure readout per frame can be applied to single or multiple image sensor unit configurations.

The image sensor unit 30 contains a time base and controller with precision to enable audio synchronization. The pixel data is readout of the image sensor unit 30 at variable clock speeds or resolutions and is captured via the frame grabber 32. The images output from the image sensor unit 30 may be captured by the frame grabber 32 either continuously or on an intermittent basis. The image sensor unit 30 can operate stand alone to generate and output image data over a high speed data link to the remote frame grabber 32. The image sensor unit 30 includes local inputs (e.g., sensor input, motor encoders, timecode, triggers, etc.) and can generate external sync and control signals (i.e., signal output which can be used to synchronize other cameras to the first camera's timebase; control can be for lens, motors, lights, etc.). The image sensor unit 30 can also accept synchronization and clock source reference from the frame grabber 32 (i.e., the frame grabber 32 gets the external sync information and sends the external sync information to the sensor or operates the sensor timing).

The image sensor unit 30 can operate in either a continuous mode or a skip frame output mode. The image sensor unit 30 can also operate in a readout mode at a rate greater than the desired capture frame rate (i.e., the rate at which data is captured by the frame grabber 32), generally twice the desired capture frame rate, and can produce an associated synchronization signal (e.g., once for every two images). This synchronization (or sync) signal can be used to instruct the frame grabber 32 to capture the intermittent or alternating frames, with specific timing relative to the top of frame readout. The sync signal can be output for external synchronization of additional cameras (e.g., sensor units, camera modules, etc.). The sync signal can also be received by the image sensor unit 30 from external sources (e.g., another image sensor unit 30, modular imaging systems (i.e., imager and frame grabber), a master sync generator which generates sync signals for all sensor units or camera modules). In this manner, the image sensor unit 30 can be programmed as a master to output the sync signals or as slave to receive a synch signal from external sources. An input (i.e., command via hardware (from external signal device (keypad), or from the frame grabber 32 thru software initiation from a recorder) to the image sensor units 30 can be used to set the operation either as a master or a Slave camera. An input can also be used to select a skip or non-skip synchronization mode. In a skip mode, the master camera (i.e., the master sensor unit) will only output a synch pulse at the top of frame of each frame that should be grabbed (i.e., captured by the frame grabber 32). The slave camera (i.e., the slave sensor unit) which is programmed for skip mode, will receive a pulse every other frame scanned from the master to begin a synchronized readout of a frame pair. The double speed readout skip capture mode allows reduced motion blur with a faster readout and also enables the use of a mechanical shutter, such as a rotating mirror shutter of the type used on traditional film cameras, with a rolling shutter readout sensor, such as are commonly found on CMOS image sensors, wherein the image exposed during the open period of the mechanical shutter can be readout during the closed period.

The frame grabber 32 includes an on-board memory (not shown) to capture full frame images (from a single or multi-exposure readout image data) or buffer the image data for transfer to a processing subsystem 34 having an associated memory (i.e., a RAM part of the frame grabber 32). The frame grabber 32 can be used for image pre-processing that includes, without limitation, noise and pixel defect correction, binning, sub-sampling, black frame offset correction, multi-exposure data mixing, data packing or data coding which may be lossy or lossless.

The frame grabber 32 is able to receive input from external components and/or from the processing subsystem 34 to initiate specific actions which may include triggers for timing synchronization or event initiation (e.g., timing synchronization of readout and event initiation such as "Start recording" or "move lens"). The external inputs can be de-bounced and re-timed relative to the image readout cycle to enable precise record start event synchronization.

The frame grabber 32 includes a time code reader (not shown) and a timing unit (not shown) for matching time reference with other system devices, such as an audio recorder (not shown). The time code reader obtains a time reference from a master source and the timing unit keeps the time like a clock. The timing unit can set its reference time from an external time code source. The time code generator is a clock which has an output connection to allow other devices to receive the current time and set its clock to match it. The timing unit (i.e., the clock) may contain a charge-storing device, such as a large capacitor, which can enable continued operation and time keeping when an external power source (not shown) is disconnected from the system 20. The system 20 may also be powered by a battery (not shown).

The frame grabber 32 may also generate outputs for controlling various devices including, without limitation, motors such as pan and tilts to position the camera (i.e., the image sensor unit 30), rotating shutters (i.e., spinning mirrors like those used on traditional film cameras), slide motion stages (i.e., that slide along a rail from the left to right side of a stage along a beam) or lens motors for zoom, focus or iris, which may be used to control a stereo 3D rig or lighting such as strobes. The frame grabber 32 can also generate synchronization signals for multi-camera operation. The frame grabber 32 can also receive external information from sensors (e.g., positioning encoders, laser distance sensors, microphones), rotating shutter position detectors, time code generators and positioning devices. The external information received by the frame grabber 32 can be used for system control and transmitted along with the imagery (i.e., the data from image sensors which can be raw or processed, codec or uncoded) for recording as metadata or user interface feedback. The frame grabber 32 can also accept audio signal input, which can be processed and mixed into the image data stream for transmission. The audio source is another data source. It is desirable to transmit the audio together to keep lip sync with the images (e.g., sounds heard correspond to images of a mouth making those sounds).

The frame grabber 32 can be used to generate color processed RGB or transformed YUV imagery at the time base of the readout from the image sensor unit 30 or scan-converted for output at a different rates. An external sync reference signal can be used to establish the rate and phase for the scan-converted output. The frame grabber 32 can output the imagery (i.e., a sequence of motion pictures) as standard definition, high definition (digital or analog signaling) or computer output formats.

The frame grabber 32 can be housed with the image sensor unit 30 in a shared housing or enclosure (not shown). In the alternative, the frame grabber 32 can be remotely connected to the image sensor unit 30 in order to allow a smaller form factor sensor unit (i.e., a camera head sized to fit into a hand, put on a goal post for sports, etc.). Combined in the same housing, the image sensor unit 30 and the frame grabber 32 (i.e., modular imaging system 28) comprise a modular camera unit 28 which can operate either standalone with an output for display or can be connected to a processing sub-system 34, capable of operating one or more modular camera units 28. The modular camera unit 28 can be removably docked (i.e., electro-mechanically connected) to the processing sub-system 34, or can be detached from the processing sub-system 34 for remote camera unit operation (i.e., remote operation of the modular imaging system 28) via wired or wireless connections. A docking mechanism (not shown) provides electro-mechanical connection of the modular camera unit 28 and the processing sub-system 34 that enables field insertion or removal of the modular camera unit 28 from the processing sub-system 34. In the docked position, the modular camera unit 28 can receive power and controls from a processor 36 comprising a portion of the processing sub-system 34 and can also transmit images (i.e., image data) and metadata to the processor 36 using the docking connections.

The modular camera unit 28 can communicate imagery (i.e., data from image sensors which can be raw or processed, codec or uncoded) using a data link and may generate an output display of the motion pictures. The data link or data channel between the frame grabber 32 and the processor 36 can transfer the raw or processed image data at variable speeds, which may be below, at or above the readout rate of the image sensor unit 30. In the case of the capacity of the data channel being less than the rate of readout from the image sensor unit 30, multiple images can be buffered in the local memory of the frame grabber 32 and images transmitted using a first in, first out (FIFO) basis or in a skipped frame fashion. All imagery may be buffered until the memory of the frame grabber 32 is filled and then emptied at the available data channel rate. A subset of the imagery being captured into the local memory of the frame grabber 32 can be transmitted to obtain a live preview display. The modular camera unit 28 can generate multiple data streams with varying bit rates that are simultaneously transmitted over a single or multiple data links. The data transmission link from the image sensor unit 30 to the frame grabber 32 or from frame grabber 32 to the processor 36 may use existing infrastructure broadcast transmission media, such as 1.5 Gigabit/sec or 3.0 Gigabit/sec capable links including Coax and triax, wireless links, fiber optics or network cables, such as CAT-5e, to transmit either the raw 2K or 4K image data or SMPTE format RGB and YUV serial digital data. The raw or color processed data, either coded or uncoded, can be transmitted on the same data transmission link. The data transmission link can also be used to simultaneously transmit the raw and processed data in either coded or uncoded formats. This enables a very high quality data set to be used for recording, while another data set is used for remote transmission or display. The data transmission links using coax or triax can incorporate a reverse control channel modulated onto the cable, from a remote processing sub-system 34. Additionally, power can be received on the triax connection. In this way, a single cable can be used for image and metadata transmission as well as control and power.

A modular camera unit 28 that uses a 2K image sensor unit 30 can use a at least one SMPTE 1.5 Gigabit/sec HD link to transmit 2K raw image data at fifty (50) images per second with 10-bit per pixel data. A modular camera unit 28 that uses a 4K image sensor unit 30 can use two or more 3-Gigabit per second links to transmit 4K raw images at minimum of 23.97 images per second with at least 10-bit precision. The 4K image sensor unit 30 can transmit image data at a minimum of 5.1 Gigabit/second and the modular camera unit 28 using the 4K image sensor unit 30 can transmit data at a minimum of 2.55 Gigabit/second. A sensor unit 30 or camera module 28 may use a four pair network cable with up to three pairs carrying data to the frame grabber 32 and the fourth pair for reverse control and optional feedback (which may include a digitally encoded display stream for output). An alternate configuration can use the network cable as a single Gigabit Ethernet connection from the frame grabber 32 that can be used to transmit 12-bit raw uncompressed data at over 100 MB/sec to enable capturing of 2048 by 1152 resolution imagery (i.e., RAW data which may or may not be coded by the frame grabber 32) at up to twenty five (25) images per second, even if the sensor unit has 4K resolution. In a sensor windowing mode, the frame grabber 32 can transmit 1280 by 720 resolutions at rates faster than standard 720P video and film rates, up to eighty five (85) images per second. At a resolution of 960 by 540, a rate of one hundred fifty (150) images per second can be achieved. Similarly, other resolutions and over-cranking frames rates can be achieved within the channel limits of the link rate. Using coding methods on the data, higher resolutions and frame rates can be transmitted, including but not limited to cinema 4K. The Gigabit Ethernet link may use power-over-ethernet or additional dedicated wire pairs alongside the Ethernet, to achieve a single connection for power, data and control.

Data received by the processing sub-system 34 includes, without limitation, image data, metadata, control signals or the like. The metadata may include information pertaining to the frame grabber 32, the image sensor unit 30, camera or lens settings, scene data, or external inputs (e.g., audio, global positioning system (GPS), Timecode or motor position feedback. The control signals may include functions for synchronization and event initiation such as starting and stopping of recordings.

The processor 36 of the processing sub-system executes reprogrammable software 38 that performs image processing for visualization, analysis, or storage. The processor 36 may be either dedicated hardware or general purpose central processing unit (CPU), graphics processing unit (GPU) or digital signal processor (DSP) or a combination thereof.

The reprogrammable software 38 can use a touchscreen oriented user interface, run on an industry-standard notebook computer or workstation x86 PC platforms, and use built-in communication and display ports or additional modules can be added into the notebook computer or workstation for additional frame grabbing, processing, storage or display output functions.

The reprogrammable software 38 can perform various image processing functions including, without limitation, image correction, interpolation, white balance, color correction, color transformation including the use of three dimensional look-up tables, motion detection, object detection and classification, tracking, triangulation, calibration, color keying, image mixing, stereographic processing, anaglyph generation, indicator overlay, focus detection, exposure metering, zooming and scaling, flipping, data packing, pattern matching and recognition, face recognition, data rate analysis, enhancement, stabilization and compression. The image processing functions may be software selectable and may be combined for multiple image processing functions.

The image data can be stored, displayed, or transmitted. The processor 36 generates a file management system for subsequent data storage. The system 20 also includes a display 40 connected to the processor 36. The display 40 can come in the form of various devices including, without limitation, electronic viewfinders, cathode ray tube (CRT) monitors, liquid crystal displays (LCD), organic light emitting diodes (OLED), LCOS displays or projectors, or stereographic displays, such as virtual reality (VR) goggles. The display 40 may be on-board the camera or remotely connected. The processor 36 generates a low latency representation of the scene 26 to the display 40 for user feedback and interactive control or positioning. In the event the processing sub-system 34 is not capable of displaying full resolution, full frame representations, the processor 36 can send a reduced resolution or reduced frame rate to the display 40 in order to maintain the low latency.

The processor 36 generates one or more outputs for display with image data, status and setting information or on-screen menus that are usable for a touch-screen user interface. The output can also be set to display image data with or without image processing in a full screen display mode without the status or operator control information, for projection or broadcasting. In this mode, it may still be possible to mix additional imagery, graphics and overlays for use in the transmission or recording. These features may include sports image annotation, advertisement insertion, animations, keying, virtual set integration or multi-channel streaming content mixing. In multiple display output configuration, one monitor or display 40 may be used for user interface and additional outputs used for full screen display with different image processing functions applied to the user images.

The processor 36 can output raw image data, image processed data or metadata in any combination for storage, transmission or display. The processor 36 can also generate outputs and external controls such as lighting controls, cooling system control, power management, motor positioning, lens controls, time code, device synchronization, multi-camera synchronization, calibration stimulus, tactile feedback, status indicators and audio.

The processor 36 monitors the temperature and recording status of the processing sub-system 34 and can automatically adjust a cooling system (not shown) that cools the processing sub-system 34. The cooling system can include a fan that dissipates heat. The processor 36 adjusts the cooling system in various ways including, without limitation, reducing fan speed, to lower the ambient noise levels generated by the camera system 20.

The processor 36 can accept input from a user (via a user interface) or the frame grabber 32 to perform specific tasks. Various input mechanisms 42 may include, without limitation, a computer mouse, a pointing device, a touch screen input, direct digital signaling or network commands. The specific tasks may include, without limitation, start or stop recording, initiate playback, adjust the settings of the frame grabber 32 and/or the image sensor 30, or select image processing or display modes.

The system 20 also includes a storage device 44. The storage device 44 can be either internal or external and either fixed or removable. Examples of various storage devices that may be used include, without limitation, non-volatile memory, flash memory, a magnetic hard drive, an optical disk and tape. For the purposes of external storage, display or processing, the processed or raw data may be externally transmitted. The transmission methods may include, without limitation, USB, Firewire/IEEE1394, SATA, Ethernet, PCI, PCI Express, Camera link, HDMI, DVI, HD-SDI, Displaylink, Infiniband, Wireless or Fiber optic link.

A particular configuration of a digital camera system 20 that uses multiple image sensor units 30 (via one or more modular camera units 28) input into a single processing sub-system 34 may be used for capturing multiple image simultaneously with the ability to synchronize the sources (i.e., sensor imaging units or camera modules), coordinate control and combine image processing, recording, display, storage and communication. This multiple camera configuration can be used for processing 30 stereographic and immersive scenes. The imagery (i.e., the RAW image data) and metadata (e.g., audio, positioning, timecode, etc.) from this multiple camera configuration can be recorded on a single removable storage medium or to independent storage devices in a synchronized fashion to enable simpler post-processing and display. The combined imagery can be outputted to specialized displays such as stereographic LCD monitors, 3D or spherical projection systems and VR goggles.

The system 20 includes software 38 stored on a memory and running on the processor 36. The software 38 provides the user with the ability to obtain stereo imaging. An imaging software program 38 provides control of single and stereo image sources (i.e., imagery) with synchronized image capture, frame grabbing, processing, metadata capture, display, coding, recording and playback, using a single user interface. The image sources (i.e., imagery) can be from image sensor units 30 or camera modules 28 capable of capturing high definition raw images at film or video rates for HD, 2K and 4K cinema quality production. As discussed above, the image sensor unit 30 may be based on at least one CMOS, CCD or other pixilated detection device that contains a time base and controller with precision to enable audio synchronization. The system 20 can record the sound or the timecode for the audio can be synchronized with the timecode for the images. A user can record the audio with the imagery or the timecode which is associated with the audio in another audio recording device which also records timecode and then tied back together during editing or post production process.

The software 38 running on the processor 36 may automatically detect the presence of an image sensing unit 30 or a camera module connected to a Network or to a hardware frame grabber 32 to determine the camera module 28 or sensor unit identification and its image capture or processing capability. Upon identification, the software 38 can load image calibration data from a storage device 44 or can initiate a calibration process, which can extract data from the connected camera module(s) 28 including, without limitation, pixel-by-pixel black level, gains, shading, and defect pixels.

The software 38 running on the processor 36 adjusts settings of the camera module 28 and/or image sensor 30. The software 38 adjusts various settings including, without limitation, resolution, frame rate, exposure, gains and stereo sync source master or slave. The software 38 can program a camera module 28 or an image sensor unit 30 as a master that uses an internal sync and outputs the sync signals or as slave that receives a sync signal from external sources (e.g., another camera module 28 or image sensor unit 30 acting as a master). The software 38 can be used to set operation of the image sensor unit 30 in a continuous or skip frame output mode and to instruct the frame grabber 32 to capture the intermittent or alternating frames, with specific timing relative to the top of frame readout.

The software 38 running on the processor 36 can be used for controlling camera and optical positioning devices on a 30 stereo rig for stereo effect adjustment such as focus, iris, inter-ocular distance and convergence. The software 38 running on the processor 36 may also control a positioning system on which the 30 rig is mounted. The software 38 running on the processor 36 can capture metadata such as rig motor position data, timecode, lens and optics settings and camera settings.

The software 38 running on the processor 36 can perform image and stereo processing functions in any combination of general purpose processor or dedicated hardware, RISC arrays or DSP's. The image and stereo functions may include, without limitation, image correction, interpolation, white balance, color correction, color transformation including the use of three dimensional look-up tables, motion detection, object detection and classification, tracking, triangulation, calibration, color keying, image mixing, stereographic processing, indicator overlay, focus detection, exposure metering, zooming, scaling, warping, flipping, data packing, pattern matching and recognition, face recognition, data rate analysis, enhancement, stabilization and compression. The image processing functions may be software selectable and may be combined for multiple image processing functions.

The software 38 running on the processor 36 can perform compression and can employ a full-frame temporal Wavelet transform codec to eliminate "block artifacts" that are often present when using DCT compression. The software 38 may have scalable precision to operate on data from 10-bit and higher, with optimized arithmetic precision based on source resolution, and scalable resolution to support a variety of formats including HD, 2K and 4K. The software 38 can use constant-quality, variable bitrate (VBR) compression that allows compression rates to rise dynamically for more complex scenes, and allows compression rates to dynamically fall for less-complex scenes. The codec can support Raw pixel data, RGB or YUV data formats. The codec can combine data from image, audio and metadata and streaming metadata in headers of files and within groups of pictures (GOP) for use in decoding and editing. The coded data can be encapsulated into industry standard format file containers such Audio-video Interleaves (AVI), Quicktime (MOV). In playback, the codec, which may be on the same software platform or part of a post-production software program, can adaptively select to decode hierarchical resolution data, inherent in the wavelet transform, to enable real-time, multi-stream editing performance in software on standard PCs, without the need for specialized hardware. The compression or coding method may be software selectable for each recording and streaming function. The software 38 can also capture and record imagery as uncompressed data at various bit depths.

The software 38 running on the processor 36 can code stereo streams as independent full-frame streams or can pre-combine the imagery into a single larger image or interleaved sequence for coding as a single stream. The metadata contained in the stream can be used to indicate the left and right image source and allow playback and editing of the stereo file as a single video source, yet displaying either source individually or as a mixed representation for stereographic display.

The software 38, either in a mobile stereo recorder of the type described below or on a separate playback system, can retrieve and render the recorded imagery into a sequence of raw images along with metadata as industry standard Digital Negative (DNG) files or as fully processed RGB or YUV images based on metadata stored within the image and data stream or in an associated container file, in formats such as DPX and TIF. The software 38 may allow modification to the associated metadata streams effects on the retrieved images. The method for debayer algorithm can be selectable or accomplished thru replacement of software modules.

The software 38 running on the processor 36 can generate processed display imagery from live or playback sources on single or dual outputs. The colorized raw or processed image data and metadata can be sent to a host (i.e., a separate computer which is not the mobile stereo recorder) for additional display, processing, recording or transmission. The software 38 can flip and mirror display imagery to enable a viewing system with two displays on a 3D beam splitter viewer. The display image data can be formatted and scaled for standard definition or high definition displays 44. For bayer image sources, the software 38 can be used to select the demosaic method, based on the available processing capability. The processed imagery may include generating stereographic displays including dual-streams image mixing, anaglyph, over-under, side-by-side, sequential switching and other modes, which may assist in perceiving the potential 3D stereo.

The overlap or mix from the dual image streaming sources may be adjusted relative to each other to change the stereo effect. The repositioning and adjustment may include translation, rotation and warping. The resulting adjustment done thru the user interface becomes another metadata source, while allowing the full-size non-adjusted original data to be transmitted or recorded.

The software 38 running on the processor 36 can operate in a client-server configuration with remote control over a wired or wireless network. The software 38 can accept a trigger to initiate synchronized start and stop recording. Client software can request and receive data from a server on the network where the data comes in various forms including, without limitation, single images, stereo image, streaming images, audio, time code, camera settings, server settings, project settings, color look up tables and other metadata. The client software can send the same or modified versions of the data back into a camera system which also has the processing, such as the mobile stereo recorder, and effect changes on the live or recorded data.

The software 38 running on the processor 36 can execute a timed motion and recording event sequence, which may include, without limitation, start recording, continuous adjustment of stereo rig positioning and lens settings such as programmed slew rates, target positions and pauses, record speed changes and event and timer triggers.

The software 38 running on the processor 36 may have a mode for calibration of a display device 44. In the calibration mode, the software 38 can generate test pattern outputs for stimulus and the response values can be measured using a connected optical sensor. A sequence of stimulus and response measurement values can then be used to create a modification to the imagery sent to the display 44, such as using 3D Look-up-tables applied to the raw data or used to modify the settings on the hardware used to generate the output.

The software 38 running on the processor 36 can combine the stereo imagery in a virtual studio which takes a video image of live scene shot against a keying color background or stage and composite them against a computer-generated 3D environment to create the illusion that the live actors are actually inside and interacting within a virtual world. The software 38 can switch between multiple stereo sources, have selectable image and audio stream mixing or delaying, chromakeying, and renderer 3D Graphic real-time. The software 38 can provide trackless camera control where the camera's motion and switching between shots are accomplished by manipulating the 3D virtual set itself rather than by manipulating the real, physical cameras. Within the Virtual Studio, movements like complicated pans, swoops, and tilts are then possible because the camera is not actually physically moving—the 3D set is. The software 38 can have a pre-defined track assigned by 3D design or manipulated through an external input device such as a joystick. The software 38 can make positional adjustments of the stereo rig (i.e., a physical package with two sensor units or camera modules) synchronized with changes in the virtual set further enhancing the stereo perception. The combined output of the stereo sources and virtual set can be displayed for live production and can be encoded for streaming and recording.

The software 38 running on the processor 36 can operate on independent hardware platforms for increase processing power, where capture, processing, switching and effects, such as virtual sets, streaming and recording can be distributed and controlled via network, yet can maintain synchronized recording events.

The software 38 running on the processor 36 records on a single removable storage medium or to independent storage devices in a synchronized fashion with common file naming conventions, to enable simpler stereo post processing, editing and playback.

Various components of the processing sub-system 34 of the system 20 can be embodied in a single housing that acts as a mobile stereo recorder 46. The mobile stereo recorder 46 executes the software 38 of the camera system 20 and can capture, process and record synchronized imagery from at least two image sensor units 30 or camera module source playback using a single user interface.

The recorder 46 includes a battery voltage input power supply with gigabit Ethernet for image and data communication. The streaming data can then be processed by a host computer, such as a single or multi-core x86 CPU with a graphics processing unit (GPU) for display and have interfaces for removable storage which may include IDE, USB, Network and SATA.

The mobile stereo recorder 46 may also use an additional multi-input frame grabber processing system. The frame grabber 32 may use FPGA devices and scalable massively parallel RISC Processor Arrays. The RISC array processor may use architecture of brics, which contain multiple compute units, such as Streaming RISC units and streaming RISC units with DSP extensions, and memory RAM units. The RAM Units can stream addresses and data over channels. These channels can be word-wide and run at 10 Gigabits per second or higher. These processors can execute an operation, do a loop iteration, input from channels, and output to a channel every cycle. These brics can connect by abutment through channels that cross bric-to-bric. The compute units and ram unit can be arranged so that, in the array of brics, there are contiguous compute units and contiguous ram units. The array processor can have a configurable interconnect in hierarchical fashion with several levels of hierarchy.

The frame grabber processing system may be capable of capturing stereo image data from multiple high-speed serial digital transmission links, such as 1.5 Gigabit and 3.0 Gigabit HD-SDI, HSDL, Easylink and Cameralink. The image data may be from image sensor units 30 or camera modules 28 in raw pixel data, color processed RGB, color-processed YUV in coded or uncoded formats. The image data may also come from broadcast video or computer sources.

The frame grabber 32 can be capable of capturing 4K image data at a minimum of 4096×2180 from an image sensor unit 30 at a minimum 5 Gigabit/sec or from a 4K camera module 28 at a minimum of 2.55 Gbit/sec of raw data.

The frame grabber processing system may be capable of stereo display outputs. Each output may be capable of displaying live or processed imagery from the sensor units or camera modules. The stereographic outputs may include stereo visualization video processing and signaling to drive dual displays or displays requiring mixed streams, included synchronization data for shutter glasses controls.

The mobile stereo recorder system 46 can execute programmable code 28 for image and stereo processing functions. The processing functions can be done by the frame grabber processor alone or in combination with the host computer and graphics processor unit. Playback can be done on the host or in combination with the frame grabber processing system, where the imagery can also be output for display. The processing and control functions of the mobile stereo recorder 46 may be remotely controlled from another system via wired or wireless network or other input device, such as touchscreen keypad with serial communication.

The mobile recorder 46 can use a single removable storage magazine 44, which may contain at least one storage media unit. The removable storage magazine may use at least one SATA interface. The storage device 44 may include a Raid controller, with drive carrier selecting the RAID storage methods, such as RAID-0 or RAID-1.

The mobile recorder 46 can be contained in an ergonomic package which enables it to mount on a stereo camera stabilizing platform, such as a steadicam and MK-V Revolution System, along with stereo image sensor units 30 or camera modules 28, which mechanically isolates the movement of the camera rig (i.e., the platform which has the sensor unit(s) or camera modules or camera with recording system) from that of the camera operator, providing a very smooth shot even when the operator is moving quickly over an uneven surface.

Figure 2:
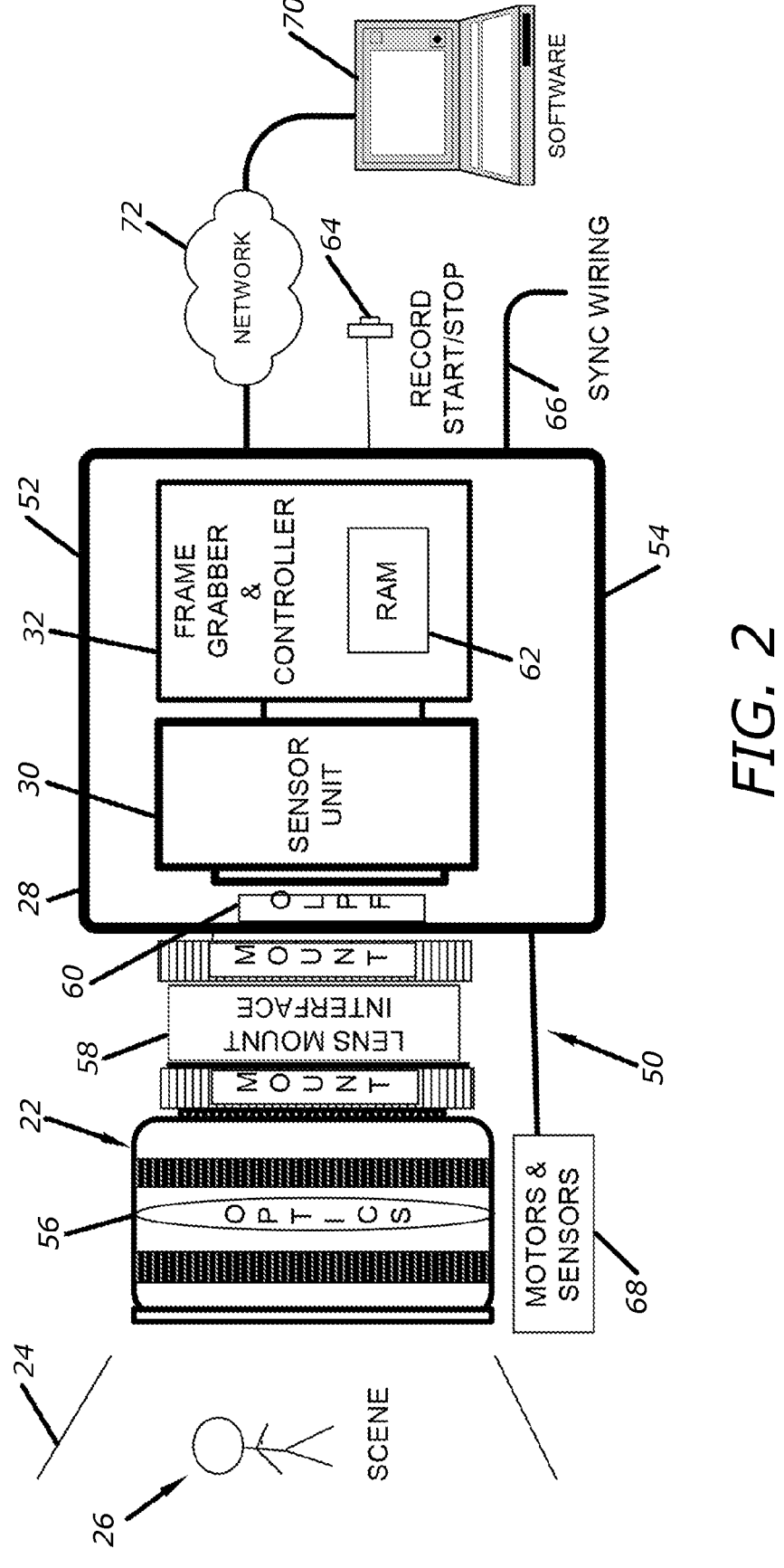
FIG. 2 is a diagram of an embodiment of the digital camera system.

In another embodiment of the present invention, as seen in FIG. 2, a digital camera system 50 includes an optical assembly 22 to gather light 24 from a desired scene 26. The system 50 also includes a modular imaging subsystem 28 aligned with the optical assembly 22 to receive light 24 gathered and/or modified by the optical assembly 22. The modular imaging subsystem 28 comprises at least one imager sensing unit or imager 30 and at least one frame grabber 32. The modular imaging subsystem and the frame grabber are in a shared housing 52 and comprise, in part, a camera module 54.

The optical assembly 22 includes optics 56 (e.g., a Carl Zeiss Super 16 Ultra Prime lens) connected to the camera module 54 at an appropriate back focal distance using an interchangeable lens optical interface mounting assembly 58 that includes an optical low pass filter (OLPF) 60 (e.g., a P+S Technik PL lens Interchange mount with Sunex Optical Low pass filter). Alternatively, the mount may be a P+S IMS Interchange Mount with calibrated back focus and sensor co-planarity adjustment mechanism. The interchangeable lens optical interface mounting assembly 58 is a precise mounting surface and locking mechanism, which enables field exchange of the lens mount to support the use of a variety of industry standard lenses such as, PL, Nikon-F, Panavision, Leica, C and Canon.

The modular imaging sub-system 28 comprises an HD/2K or 4K CMOS image sensor unit 30 and a frame grabber and controller 32. One example of an image sensor unit 30 is an Altasens 4562 2K and HD CMOS system-on-chip, Xilinx FPGA, Microchip PIC micro controller, Linear LT series Linear regulators, IDT ICS-307 programmable clock and Fox 924 temperature controlled crystal oscillator. Another example of an image sensor unit 30 is an Altasens 8472 Quad HD and 4K format capable sensor. An example of a frame grabber and controller 32 is a Pleora iPort with FPGA, RAM Buffer and Gigabit Ethernet connectivity with serial ports and GPIO for programmable device control and communication. An example of a camera module 54 comprising an integrated imaging sub-system 28 in a housing 52 is an SI-2K MINI digital camera from Silicon Imaging, Inc. The SI-2K MINI includes an Altasens 4562 CMOS imaging sensor unit and a Pleora frame grabber. The SI-2K MINI is capable of capturing 2K (2048×1152), 1080P HD (1920× 1080), 720P (1280×720) AND 540p (960×540) resolution motion pictures. The SI-2K MINI can operate at various film and video rates including 23.97, 24, 25, 29.97, 30, 50, 59.9 and 60 frames per second. The SI-2K MINI has local RAM buffer 62 to capture images at higher rate than the channel capacity and can buffer frames and transmit on a skip frame basis. Minimum Resolution for 2K is 2048×1080 and minimum film rates would be 23.976, except for special time lapse shoot. For 4K shooting, a minimum resolution is 4096×1714. A film rate is approximately 23.976 frames per second (i.e., 24 frames per second) and video rate is 25-30 frames per second.

Channel bandwidth between image sensing unit and frame grabber and between frame grabber and processor is sufficient for transmission to enable full resolution motion picture raw image or data processing. This means the pipe to move the data from the sensor to the frame grabber must be fast or wide enough to carry all the raw pixel data as it is reading out of the sensor at the film and video rates. For example, to move 2K image, which has 3.3 MB per frame at 48 frames per second would require almost 200 MB/sec throughput from the sensor to the frame grabber. Often, readout from the sensor is at 2× the speed than needed to capture in the frame grabber 32. The frame grabber 32 then only needs to move 24 FPS or 100 MB/sec to the PC for processing. It is reasonable to have the frame grabber 32 do lossless coding of the data to achieve a 2:1 data reduction, which would get the frame grabber to host link bandwidth at 50 MB (hence a minimum of 48 MHz as Intel 4).

The system 50 includes a record start/stop button 64 (e.g., a momentary mechanical switch) electro-mechanically connected to the camera module 54 along with power and sync input and output wiring 66 using a connector (e.g., an 8-Pin Lemo FGG.1B.308.CLAD52 connector). An output signal is a light emitting diode (LED) (not shown) electro-mechanically connected to the iPort GPIO that illuminates when recording is active and un-illuminated when recording is non-active.

The system 50 further includes a plurality of motors and sensors 68 (e.g., a C-motion lens control system, a Preston Motor and control system, etc.) that act as adjustment mechanisms to adjust the position of the image sensor unit relative to the optical center of the lens projected image circle and/or to adjust the co-planarity of the sensing plate upon which the image sensor pixel circuit board rests relative to the optical interface mounting assembly 58. The sensor is mounted behind the lens and can be adjusted for flatness, centering and rotation. Any of the adjustment mechanisms can include an electronic positioning device for remote operation.

The system 50 further includes a laptop notebook computer 70 connected to the camera module 54 by a cable (not shown) (e.g., a CAT-5e Ethernet cable) through a Network 72. The cable is connected to the camera module 54 by a connector (e.g., a 12-pin LEMO FGG.2B.312.CLAD52 Connector). One example of the notebook computer 70 is a Dell M90 with a Marvell Yukon Gigabit Ethernet Expresscard for camera connectivity. On-board wired and wireless Ethernet ports of the notebook computer provide remote connections streaming, internet connectivity and control.

Figure 3:
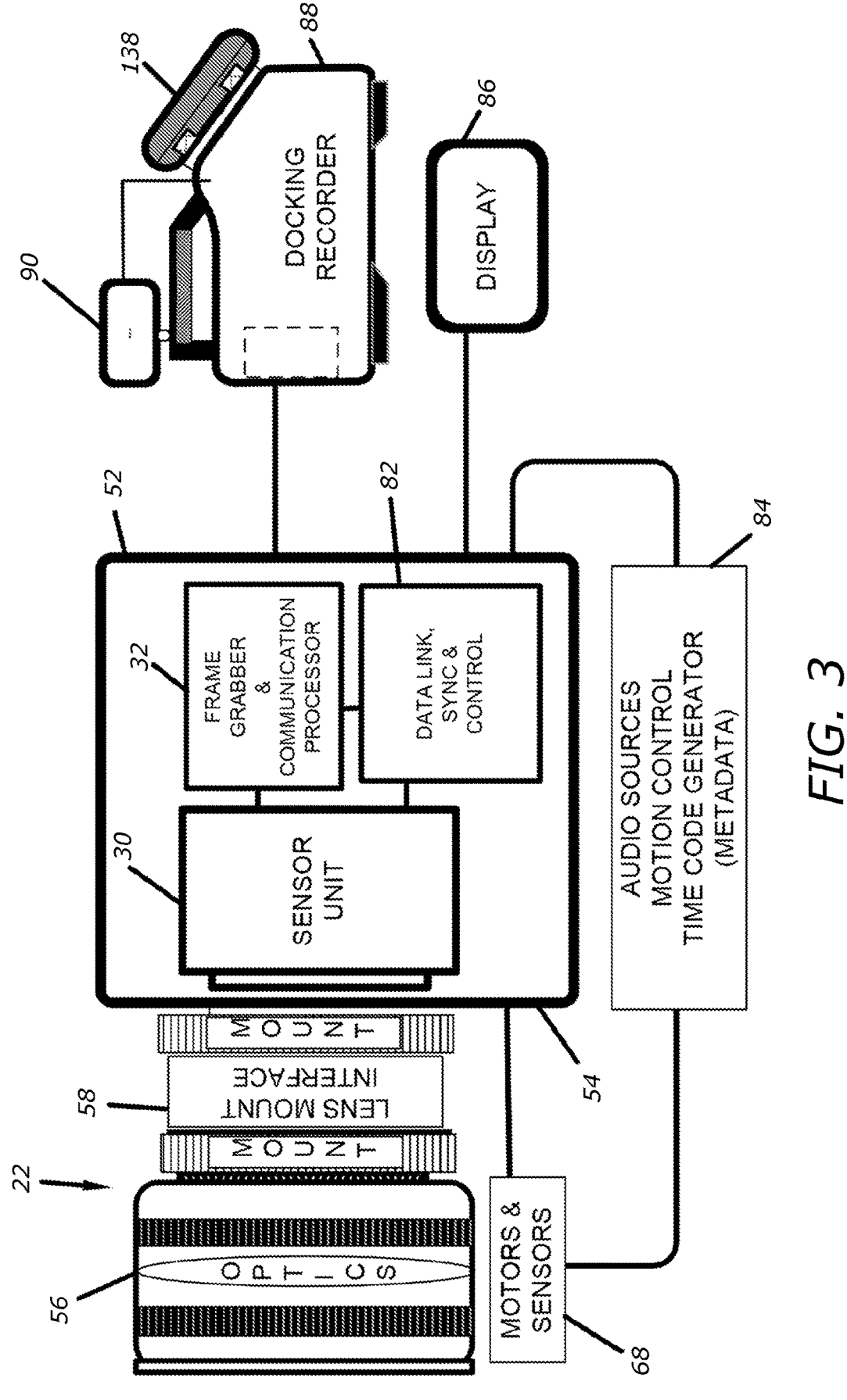
FIG. 3 is a diagram of an alternate embodiment of the digital camera system.

A further embodiment of the present invention is illustrated FIG. 3, where a digital camera system 80, similar to the digital camera system 50 described above, includes a camera module 54, as described above in relation to FIG. 2, that has an additional capability for the frame grabber 32 to process raw video into a live video output. The additional frame grabber processing section comprises a data link, sync and control unit 82 (e.g., an Altera FPGA with Lux Media Plan HD-1100 raw color processing core, dedicated clock reference for 74.25 and 74.1758 MHz, Gennum GS Series Serializers and cable drivers for 1.5 or 3 Gbit/sec HD-SDI, IDT Dual Port FIFO for external time base synchronization or retiming, SSRAM, Flash and Analog Devices RAM-DACs for SVGA Output) connected to the sensor imaging unit 30 and the frame grabber 32. The processing core of the frame grabber 32 can convert raw pixel data into RGB data using demosaic, image correction and color conversion. The processing core can also convert between RGB and YUV spaces and output either 4:4:4 or 4:2:2 data. The same data link which carries the color processed data from the frame grabber 32 to the viewing and recording system can also be used to transmit the raw data.

The system 80 further includes an input unit 84 electro-mechanically connected to the camera module 54 and a plurality of motors and sensors 68 that are also electro-mechanically connected to the camera module 54. The input unit 84 includes audio sources, motion control and a time code generator. An Audio codec (not shown) with preamps can receive line or microphone level audio input to mix into the data stream. The time code generator can be an Ambient ALL-601. The plurality of motors and sensors 68 are used, in part, to control the lens (e.g., a C-motion lens control system) act as adjustment mechanisms to adjust the position of the image sensor unit 30 relative to the optical center of the lens mount and/or to adjust the co-planarity of the sensing plate (i.e., the surface or circuit board which holds the image sensor in the correct position) relative to the optical interface mounting assembly 58.

The system 80 also includes a display 86 (e.g., a Cine-Tal CineMage LCD Monitor, a Lite-Eye LE-450 OLED view-finder or the like) for viewing image data output from the camera module 54. Image, metadata and controls touch-screen user interface can also be shown on this display.

The system 80 additionally includes a docking recorder 88. One commercial available example of a docking recorder is a SI-2K available from Silicon Imaging, Inc., running SiliconDVR software, with remote camera module 54 (e.g., an SI-2K MINI) with Live Video output processing. The docking recorder 88 includes USB ports to connect the docking recorder 88 with a number of photometric measuring devices (e.g., a colorimeter which measures intensity at different light wavelengths) which can be placed on a display 90 of the docking recorder 88 to create calibration profiles. The calibration profiles serve to get accurate settings independent of monitor adjustments (e.g., the user may have turned a color hue knob on the monitor) such that orange will be orange and not orange-red. The camera module 54 can be electro-mechanically docked with the docking recorder 88.

Figure 4:
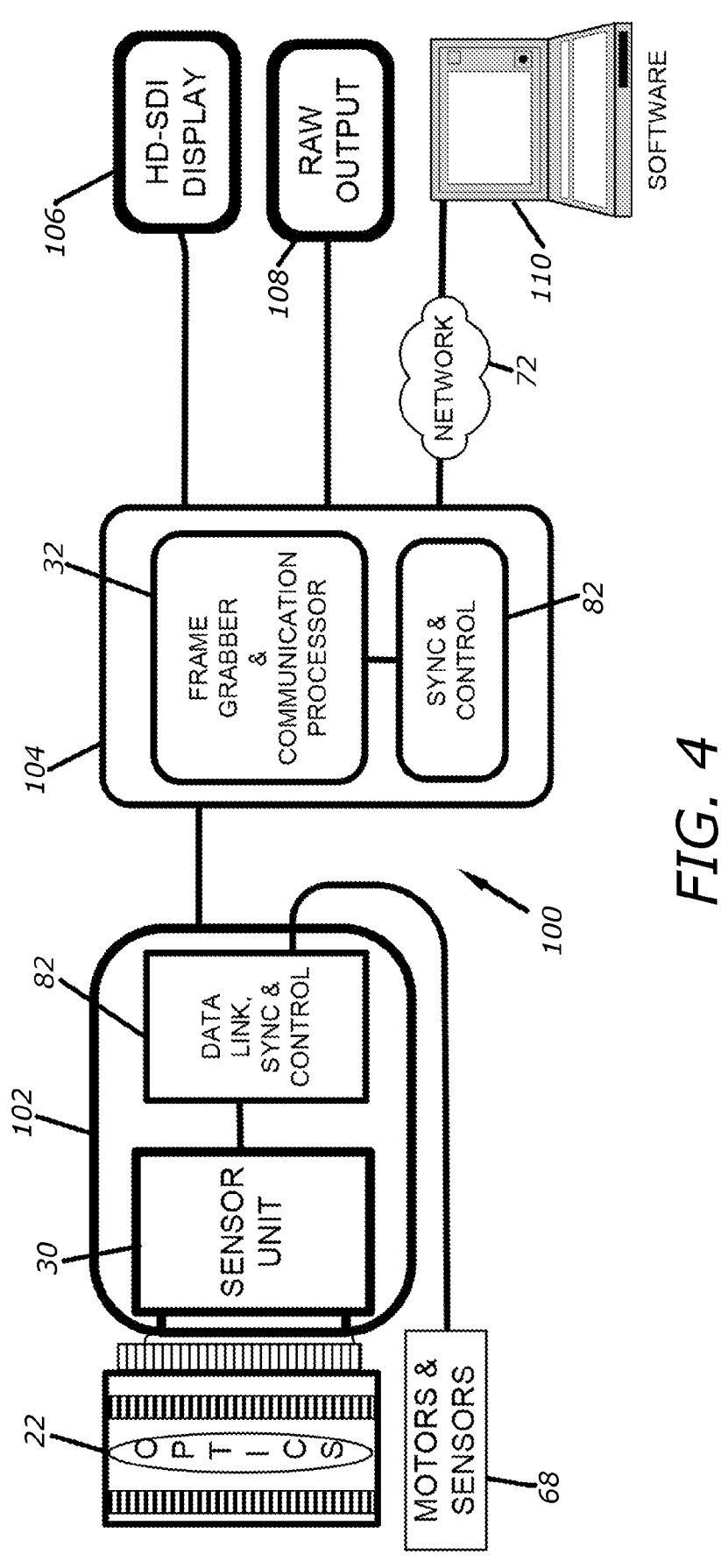
FIG. 4 is a diagram of an additional embodiment of the digital camera system covering a remote sensor and frame grabber camera module.

An additional embodiment of the present invention is illustrated FIG. 4, where a digital camera system 100, similar to the digital camera systems 50 and 80 described above, includes a camera head module 102 comprising an optical assembly 22, an image sensor unit 30 and a data link, sync and control unit 82 that is located remotely from a frame grabber unit 104 comprising a frame grabber unit 32 and a sync and control unit 82.

The remote camera head module 102 uses an HD/2K or 4K CMOS image sensor unit 30 (e.g., an Altasens 4562 2K and HD CMOS system-on-chip, an Altasens 8472 Quad HD and 4K format capable sensor), a Xilinx CPLD for sync and sensor timing control, a Microchip PIC micro controller, Linear LT series Linear regulators, an IDT ICS-307 programmable clock and a Fox 924 temperature controlled crystal oscillator. The camera head module 102 also includes a National Channelink LVDS 28:4 DS90 serialization and National LVDS receiver and driver for serial communication and trigger input and output. The optical assembly 22 includes a lens mount comprising a back focus adjustable c-mount (e.g., a P+S IMS Interchange Mount with calibrated back focus and sensor co-planarity adjustment mechanism) and an optic (e.g., a Linos Me Vis c-mount lens, a P+S interchange B4 optical mount and Zeiss Digiprime Lens or the like).

This remote camera head module 102 is commercially available as either a SI-2K MICRO-CL or SI-1920HD-CL with 4562 sensor from Silicon Imaging, Inc. An alternate link configuration uses an National EasyLink DS32ELX0421 for transmission over CAT5e and Coax and triax. Another link configuration uses FPGA with built-in serializer logic and either National or Gennum cable drivers. A further link configuration uses a triax cable to transmit image and associated data, receive control data via demodulation, and receive power. If power is applied locally to the image sensor unit 30, a coax cable can then operate on coax.

An Altera FPGA Serializes the sensor data output (i.e., the data from the sensor or from the analog digital converter which samples the pixel photosite) and uses at least one Easylink or cable driver for the data link. One configuration uses a Cat-5 with up to 3 pairs for transmitting the serialized data to and from the sensor unit and one pair for power. The frame grabber 32 and processing unit (i.e., the processing unit which can perform video processing for display) are described above with respect to the SI-2K MINI with Video processing where the image sensor unit 30 is remotely connected. One connection output from the frame grabber unit 104 drives an HD-SDI display 106 while another connection output from the frame grabber unit 104 outputs raw pixel data 108, either coded or uncoded.

The camera head module 102 is connected via a network 72 for remote control and setup. The camera head module 102 can also be connected to a MacbookPro notebook computer 110 running bootcamp and WindowsXP. Silicon Imaging SiliconDVR software is used for camera control, processing, display and recording. Alternatively, the camera head module 102 can be connected to an SI-2K docking recorder 88 running SiliconDVR software.

The system 100 further includes a plurality of motors and sensors 68 that are also electro-mechanically connected to the camera head module 102. The plurality of motors and sensors 68 are used, in part, to control the lens (e.g., a C-motion lens control system) act as adjustment mechanisms to adjust the position of the image sensor unit 30 relative to the optical center and/or to adjust the co-planarity of the sensing plate relative to the optical assembly 22.

Figure 5:
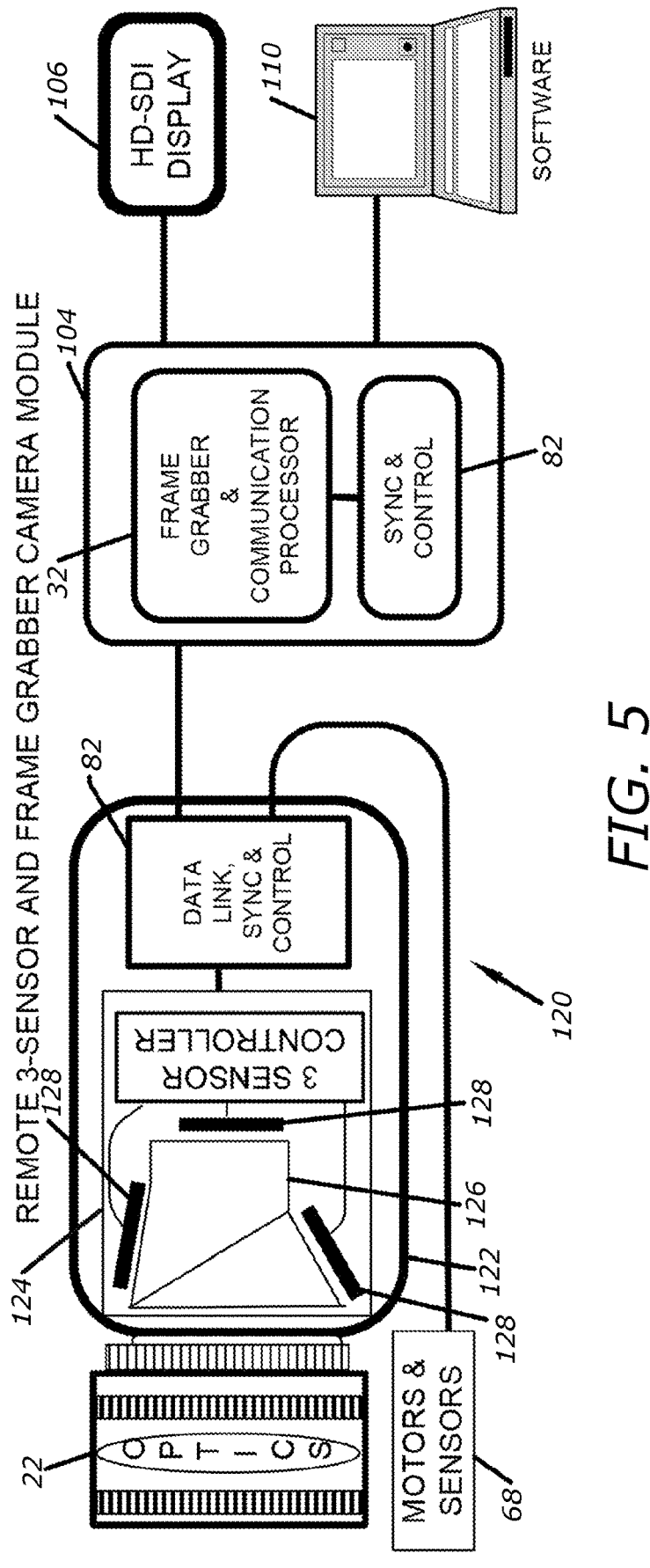
FIG. 5 is a diagram of another embodiment of the digital camera system covering a remote three-sensor and frame grabber camera module.

An embodiment of the present invention is illustrated FIG. 5, where a digital camera system 120, similar to the digital camera systems 50, 80 and 100 described above, includes a camera head module 122, similar the camera modules 54 and 102 described above, comprising an optical assembly 22, at least one pixilated multi-sensor image sensor unit 124 and a data link, sync and control unit 82 that is located remotely from a frame grabber unit 104 comprising a frame grabber unit 32 and a sync and control unit 82.

The remote camera head module 122 further comprises an optic 126 (e.g., a beam splitter) to split light 24 in multiple directions. For example, one particular configuration of the camera head module 122 comprises two sensors 128 (each sensor 128 having an array of pixels) and a beam splitter 126 for stereo 3D or wide dynamic image capture. Each sensor 128 can comprise either a monochromatic pixel array or a color-filtered pixel array. Each of the sensors 128 can be controlled and moved mechanically or, alternatively, each of the sensors 128 can be electronically windowed to move the readout region of the particular sensor 128. One of the two sensors 128 can be replaced with an optical viewfinder port, allowing simultaneous thru-the-lens focusing and digital capture. In an alternate configuration, the camera head module 122 comprises an RGB prism 126 and three monochromatic sensors 128 (as seen in FIG. 5), one for each color channel. Additional prism ports are added to achieve additional targeted wavelength or full spectrum illumination range capture. One connection output from the frame grabber unit 104 drives an HD-SDI display 106.

The camera head module 122 is connected for remote control and setup. The camera head module 122 can also be connected to a MacbookPro notebook computer 100 running bootcamp and WindowsXP. Silicon Imaging SiliconDVR software is used for camera control, processing, display and recording. Alternatively, the camera head module 122 can be connected to an SI-2K docking recorder 88 running SiliconDVR software.

The system 120 further includes a plurality of motors and sensors 68 that are also electro-mechanically connected to the camera head module 102. The plurality of motors and sensors 68 are used, in part, to control the lens (e.g., a C-motion lens control system) act as adjustment mechanisms to adjust the position of the image sensor unit 124 relative to the optical center and/or to adjust the co-planarity of the sensing plate relative to the optical assembly 22.

Figure 6:
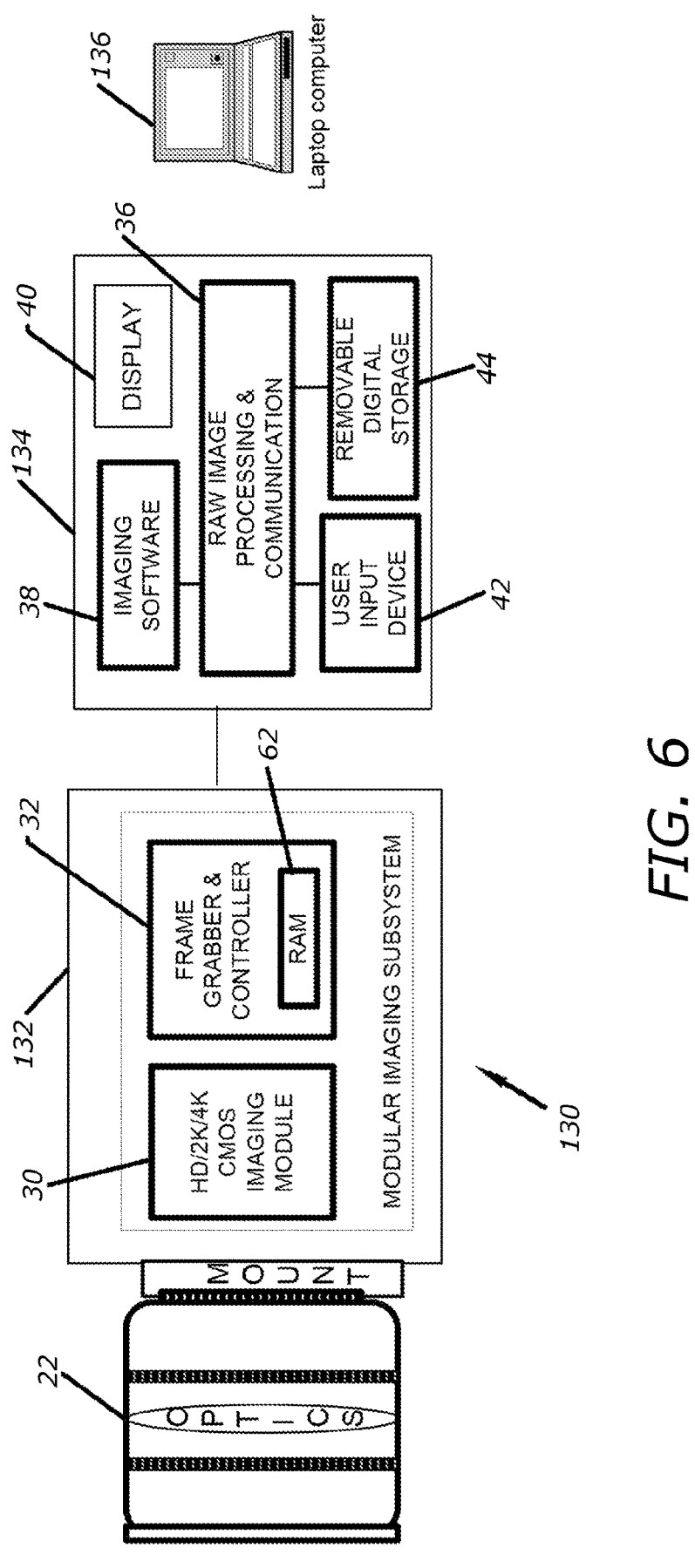
FIG. 6 is a diagram of yet another embodiment of the digital camera system.

FIG. 6 illustrates an additional embodiment of the present invention, where a digital camera system 130, similar to the digital camera systems 50, 80, 100 and 120 described above, includes an optical assembly 22, a camera head module 132, similar the camera modules 54, 102 and 122 described above, connected to the optical assembly 22. The camera head module 132 is remotely located from a processing, storage and display system 134. The camera head module 132 can be in the form of an SI-2K MINI, as described in detail above and shown in FIG. 2, where the image sensing unit 30 comprises a Kodak 2 k×2 k CCD and the processing, storage and display system 134 comprises a Dell Precision Workstation with Intel Core 2 Duo processor, Intel Pro/1000 Gigabit Multiple Port Network Interface card, Nvidia Quadro Graphics GPU, CRU Removable DP-25 SATA Cartridge system and LCD display with 1920×1200 native resolution. The camera head module 132 (i.e., SI-2K MINI) is powered by a 12 VDC supply or Li-ion battery, such as an Anton Bauer Dionic 90 and is connected to the processing, storage and display system 134 using Gigabit Ethernet over CAT5e or thru Cisco fiber optic links and routers. The 12-bit raw imagery and metadata is transmitted between the camera head module 132 (i.e., the SI-2K MINI) and the processing, storage and display system 134 (i.e., the Dell Precision Workstation) at minimum sustained data rates of 80 MB/sec for 2K DCI 2048×1080 capture, control, visualization, recording and communication. A laptop notebook computer 136 (e.g., a Dell M90) is connected to the processing, storage and display system 134 (i.e., the Dell Precision Workstation) via wired or wireless network for remote control, viewing, playback and metadata management.

Figure 7:
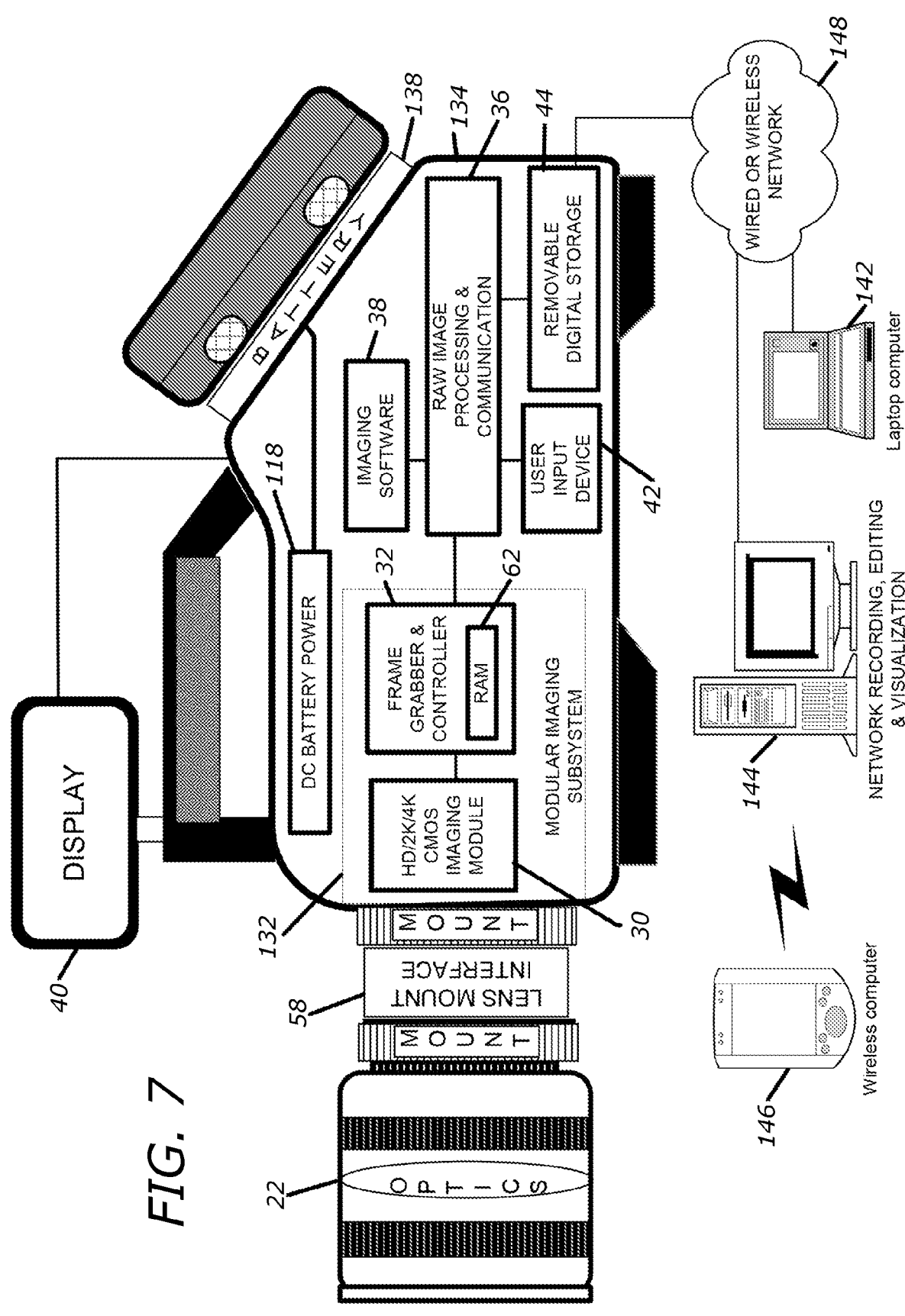
FIG. 7 is a diagram of an alternate embodiment of the digital camera system.

As seen in FIG. 7, another embodiment of the present invention illustrates a digital camera system 140, similar to the digital camera systems 50, 80, 100, 120 and 130 described above, showing a modular imaging sub-system 28 that comprises, in part, a camera head module 132 that is docked with a processing, storage and display system 134. The camera head module 132 is commercially available as the SI-2K MINI, as described above in other embodiments. The processing, storage and display system 134 includes a raw image processing and communication unit 36 (e.g., a computer based on an Intel Core 2 Duo T7600 2.33 GHZ multi-core processor with dual channel DDR2 667 MHZ RAM, Intel PRO/1000 Gigabit Ethernet and Intel GMA950 Integrated GPU with dual HD video outputs, such as the MEN F17 Modular Compact PCI system). The processing, storage and display system 134 also includes a user input device 42 (e.g., an Interlink Micromodule mouse pointing module) connected via USB to the processor 36. The processing, storage and display system 134 also includes another user input device 42 in the form of a Soundevice USBPre for audio input. The processing, storage and display system 134 further includes a battery 138 (e.g., an Anton Bauer Hytron 140 Lithium Ion connected via the Anton Bauer Gold Mount plate or external 4-pin Neutrik XLR) and a DC battery input power supply 118 (e.g., an Opus Solutions DCA7.150 150 W DC-DC converter) which delivers regulated 12 VDC power for peripherals and 5 VDC to power the processing and communication subsystem 134.

The processing and communication subsystem 134 further includes a display device 40 (e.g., a Xenarc 700TSV LCD Monitor with touchscreen (where the touch screen also provides an additional user input via a USB interface) or Kopin Cyberdisplay with DVI interface are display devices.

The imaging software 38 used in the processing and communication subsystem 134 is the Silicon Imaging SiliconDVR program running under Microsoft Windows XP. Other software tools used by the SiliconDVR for image processing include Microsoft Direct-X graphics, CineFormRAW Codec and Iridas Speedgrade 3D look-up-table software.

The processing and communication subsystem 134 additionally includes removable digital storage 44 (e.g., a CRU DP-25 SATA RAID Frame, Kingwin KF-25 mobile rack with Seagate 2.5" Hard drive, Crucial Flash device, or 32 GB Intel SLC Solid State Drive SSD Device with 150 MB/sec write speed). The system 140 includes a laptop computer 142 (e.g., a Dell Precision M90) and a Network recording, editing and visualization system 144 (e.g., a Dell Precision 390 workstation) and a wireless computer 146 (e.g., a motion computing LE1700). The laptop computer 142 and the Network recording, editing and visualization system 144 are each connected to the removable digital storage 44 of the processing and communication subsystem 134 via a wired or wireless network 148. The wireless computer 146 operates over a 802.11 wireless network which is using D-link wired or wireless routers or USB wireless networking devices to connect to the other components of the system 140.

Figure 8:
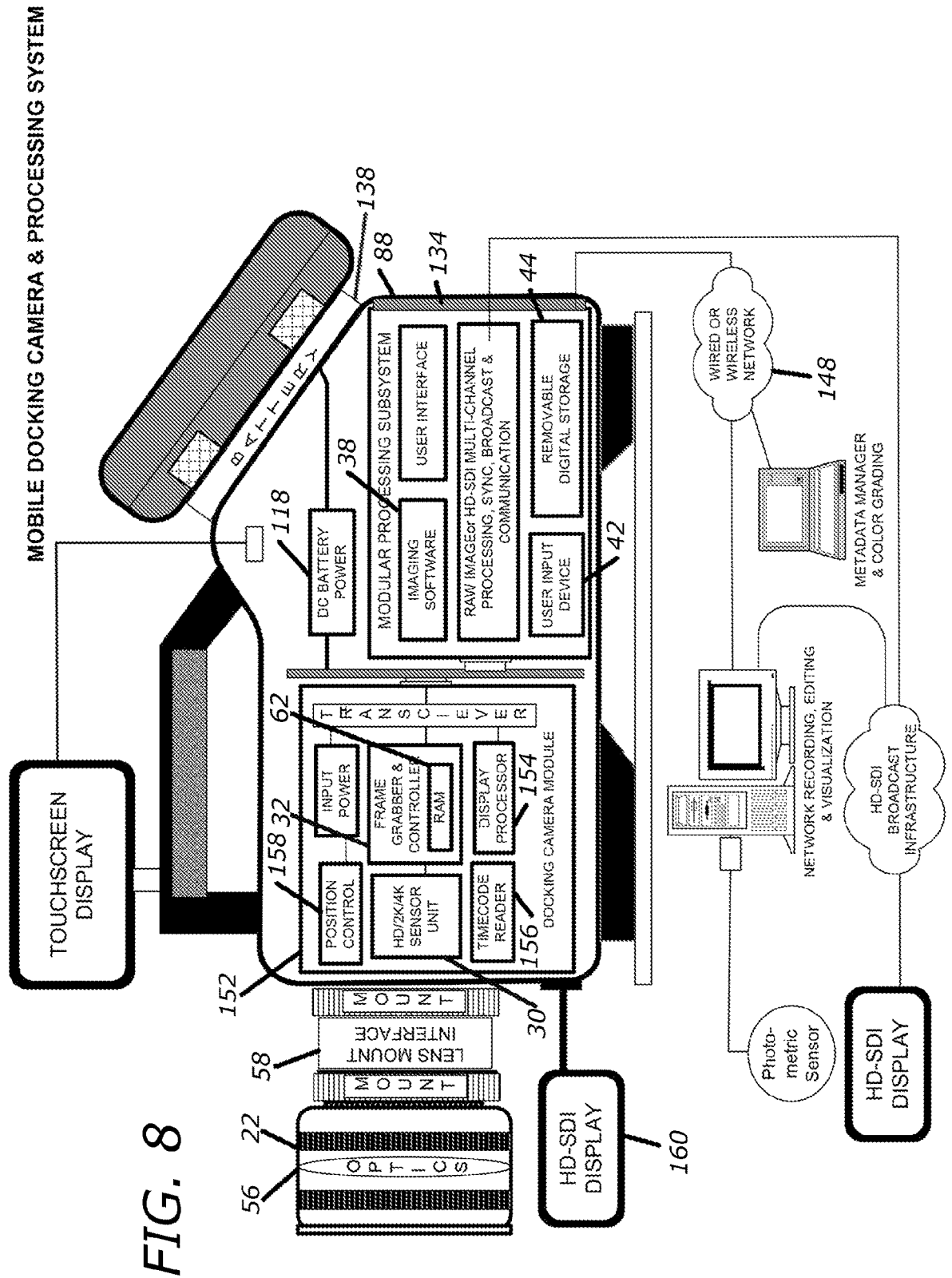
FIG. 8 is a diagram of another embodiment of the digital camera system a mobile docking camera and processing system.

An additional embodiment of the present invention is illustrated FIG. 8, where a digital camera system 150, similar to the digital camera systems 50, 80, 100, 120, 130 and 140 described above, comprises an image sensor and frame grabber camera module 152, similar the camera modules 54, 102, 122 and 132 described above, including a display processor 154, embedded time-code reader 156 and motion control 158, where the camera module 152 is docked with the modular processing, storage and display system 134. The system 150 includes an optical assembly 22. The camera modules includes a CMOS image sensor unit 30 (e.g., an Altasens 4562 HD/2K sensor or 8472 Quad HD and 4K format capable sensor). An Altera FPGA serializes the sensor data output and uses at least one Easylink or cable driver for a data link. One configuration uses three or more pair for transmitting the 4K serialized data to and from the image sensor unit 30 and one pair for power. The camera module 152 is connected to the docking recorder 88 by a connector (e.g., a 12-pin LEMO FGG.2B.312.CLAD52 Connector). An Additional LEMO connector is docked.

The optical assembly 22 includes optics 56 (e.g., a P+S interchange B4 optical mount and Zeiss Digiprime Lens) and a lens mount (e.g., a P+S IMS Interchange Mount with calibrated back focus and sensor co-planarity adjustment mechanism).

The modular processing sub-system 134 comprises a computer based on an Intel Core 2 Duo T7600 2.33 GHZ multi-core processor with dual channel DDR2 667 MHZ RAM, Intel PRO/1000 Gigabit Ethernet and Intel GMA950 Integrated GPU with dual HD video outputs, such as the MEN F17 Modular Compact PCI system. The processing sub-system includes at least one user input device 42 (e.g., an Interlink Micromodule mouse pointing module connected) via USB to the processor 36.

A frame grabber processing unit 32 is connected to the MEN F17 Modular Compact PCI system using a PCIe bus interface daughter card, which contains Altera FPGA and at least one Ambric AM2045 scalable massively parallel RISC Processor Array, and DDR2 400 RAM with 4-lane PCIe interface. The serialized data from the camera module 152 is received thru National Easylink or HD-SDI receiver deserializers and then converted thru the FPGA to parallel data for input into the Ambric frame grabber, where it can then be processed and color corrected and compressed using a Wavelet Codec, such a Cineform or JPEG2000. The same receivers can alternately be used for multiple camera module input. The raw data or coded data can be accessed by the Intel Core 2 duo processor, where the processor can perform additional image processing, visualization output or recording. An additional Ambric processor can be used for video format conversion and re-timing for live display in HD-SDI or computer format. The processed video can also be sent back on a data pair back to the camera module 152 for displays 40 connected directly to the camera module 152 and where there is insufficient processing or space for performing the processing in the camera module itself. An alternate display section uses the Lux Media Plan Video processing core and memory buffers to produce scaled and retimed live video in SD, HD and 2K outputs. The processing section can support dual outputs for stereo display.

Additional computers connected to the system can be used to adjust and manage metadata which can adjust settings such as visualization modes, used for recording of image data streams or used for processing of streams into live outputs for display on local monitors or to live or playback broadcast feeds. The computers can also be used to capture photometric sensor data to adjust the display calibrations which can become part of the visualization image processing. A laptop notebook computer (e.g., a Dell M90) is connected to the processing, storage and display system 134 (i.e., the Dell Precision Workstation) via wired or wireless network for remote control, viewing, playback and metadata management.

Figure 9:
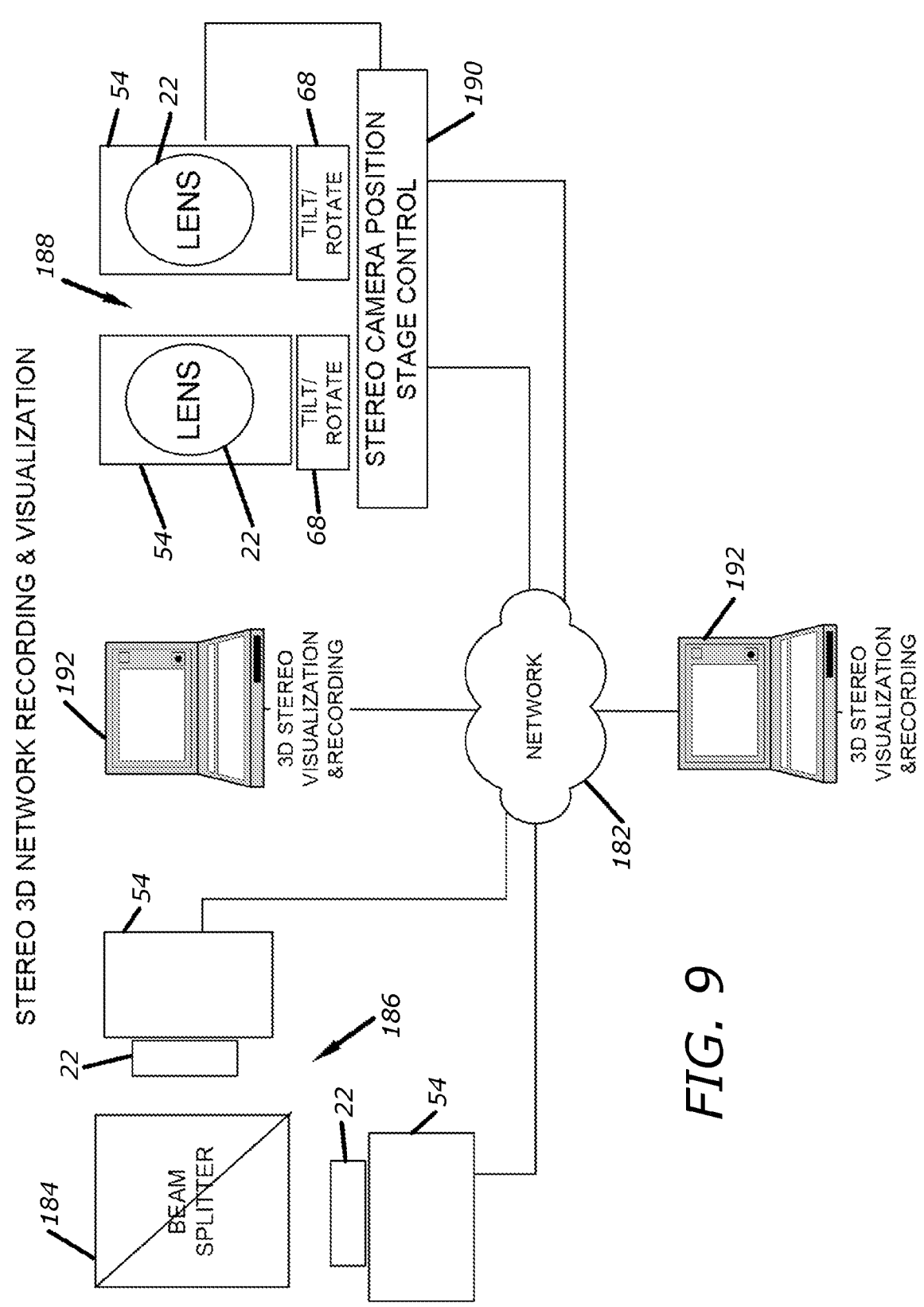
FIG. 9 is a diagram of another embodiment of the digital camera system covering stereo 3D network recording and visualization.

FIG. 9 illustrates an alternate embodiment of the present invention where a digital camera system 180, similar to the digital camera systems 50, 80, 100, 120, 130, 140 and 150, comprising multiple camera modules 54 (e.g., SI-2K MINI) and multiple processing, recording and display sub-systems connected via network 182. The camera modules 54 (e.g., SI-2K MINI) are configured with an optical mount (e.g., a P+S Technik B4 optical mount and Angenieux 19×7.3 BESSDE HR Motorized Lens) and are powered from an external 12 VDC supply or Anton Bauer Hytron 140 Gold mount systems.

A first pair 186 of camera modules 54 (e.g., SI-2K MINI) are mounted for 3D stereo capture of a common scene thru an Edmund Scientific NT46-584 optical beam splitter 184. The two camera modules 54 are cabled together and are synchronized to capture at the same rate and to begin scanning with a common frame start time.

A second pair 188 of camera modules 54 (e.g., SI-2K MINI) are mounted adjacent to each other for 3D stereo capture on a synchronized multi-axis pan, tilt, theta and slide motorized stage system with Newport controllers 190. The motor positions are operated from software 38 either manually, in response to image processing or as a pre-set sequence triggered by events or timers. The system 180 also includes two notebook computers 192 (e.g., Dell Precision M90s) networked using a Cisco Gigabit Router.

The imaging software 38 is the Silicon Imaging SiliconDVR program with multi-camera and stereo visualization, recording and control tools running under Microsoft Windows. Other software tools used by the SiliconDVR for image processing include Microsoft Direct-X graphics, CineFormRAW Codec and Iridas Speedgrade 3D look-up-table software.

The software 38 is running on both notebook computers 192 and can be configured to view and control multiple camera modules 54 using a single display with mixed, stitched or perspective-corrected views. The data from the multiple camera modules 54 can be recorded on either computer 192 or both computers 192 simultaneously with multicasting enabled.

Figure 10:
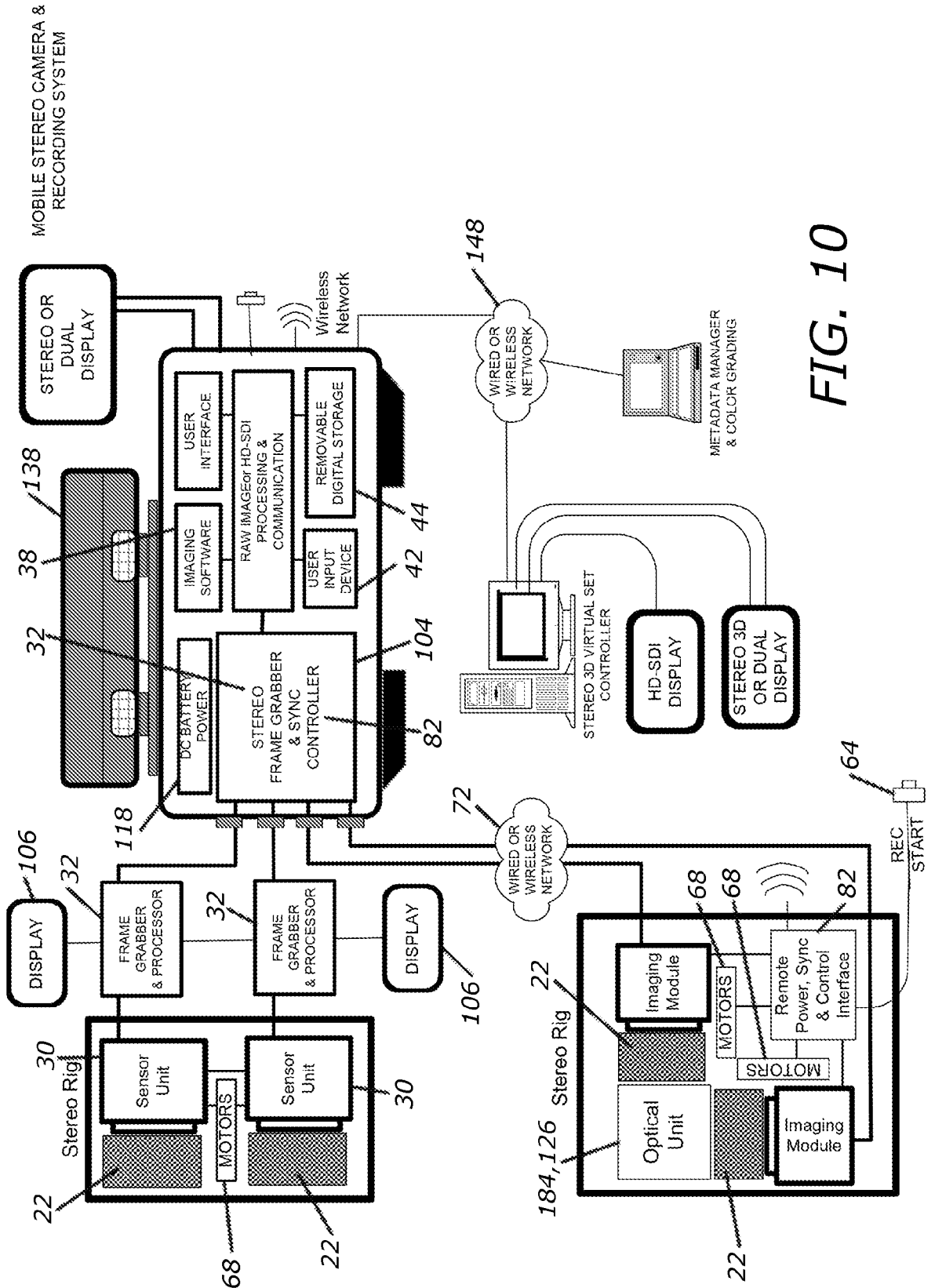
FIG. 10 is a diagram of another embodiment of the digital camera system covering a mobile stereo camera and recording system.

As seen in FIG. 10, another embodiment of the present invention illustrates a digital camera system 200, similar to the digital camera systems 50, 80, 100, 120, 130, 140, 150 and 180 described above, the disclosed Mobile Stereo camera and recording system. It comprises stereo pairs of camera modules, as described in FIGS. 1, 2, 3 and 4 on stereo rigs connected to a Frame grabber processing system as described above in FIG. 8.

Figure 11:
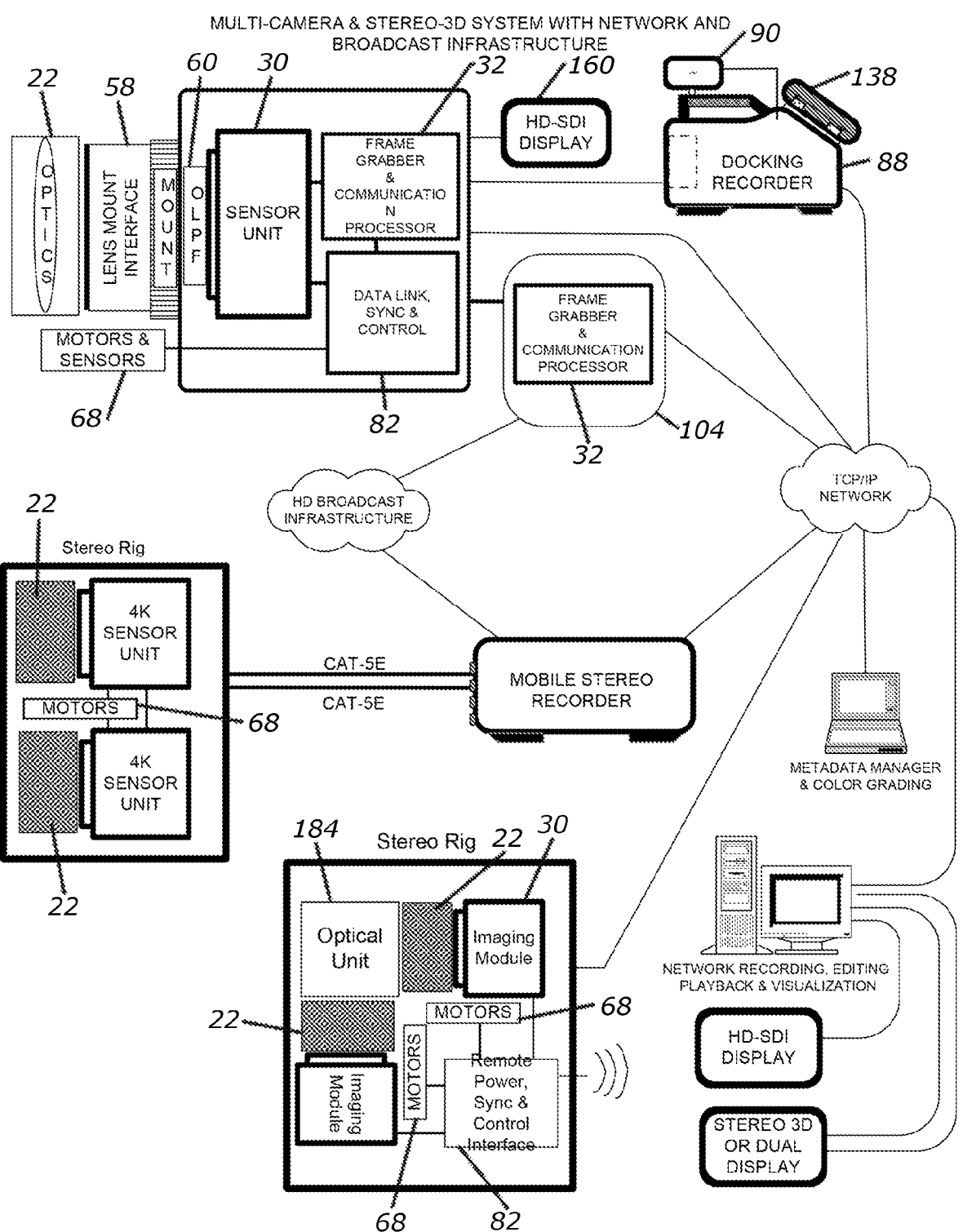
FIG. 11 is a diagram of another embodiment of the digital camera system covering a multi-camera and stereo-3D system with network and broadcast infrastructure.

FIG. 11 illustrates an alternate embodiment of the present invention where a digital camera system 300, similar to the digital camera systems 50, 80, 100, 120, 130, 140, 150, 180 and 200 described above, comprising a plurality of multiple camera modules, stereo rigs, mobile recorders and remote clients operating any of the subsystems via wired or wireless network, producing live 2D or 3D content for broadcast or network streaming.

Figure 12:
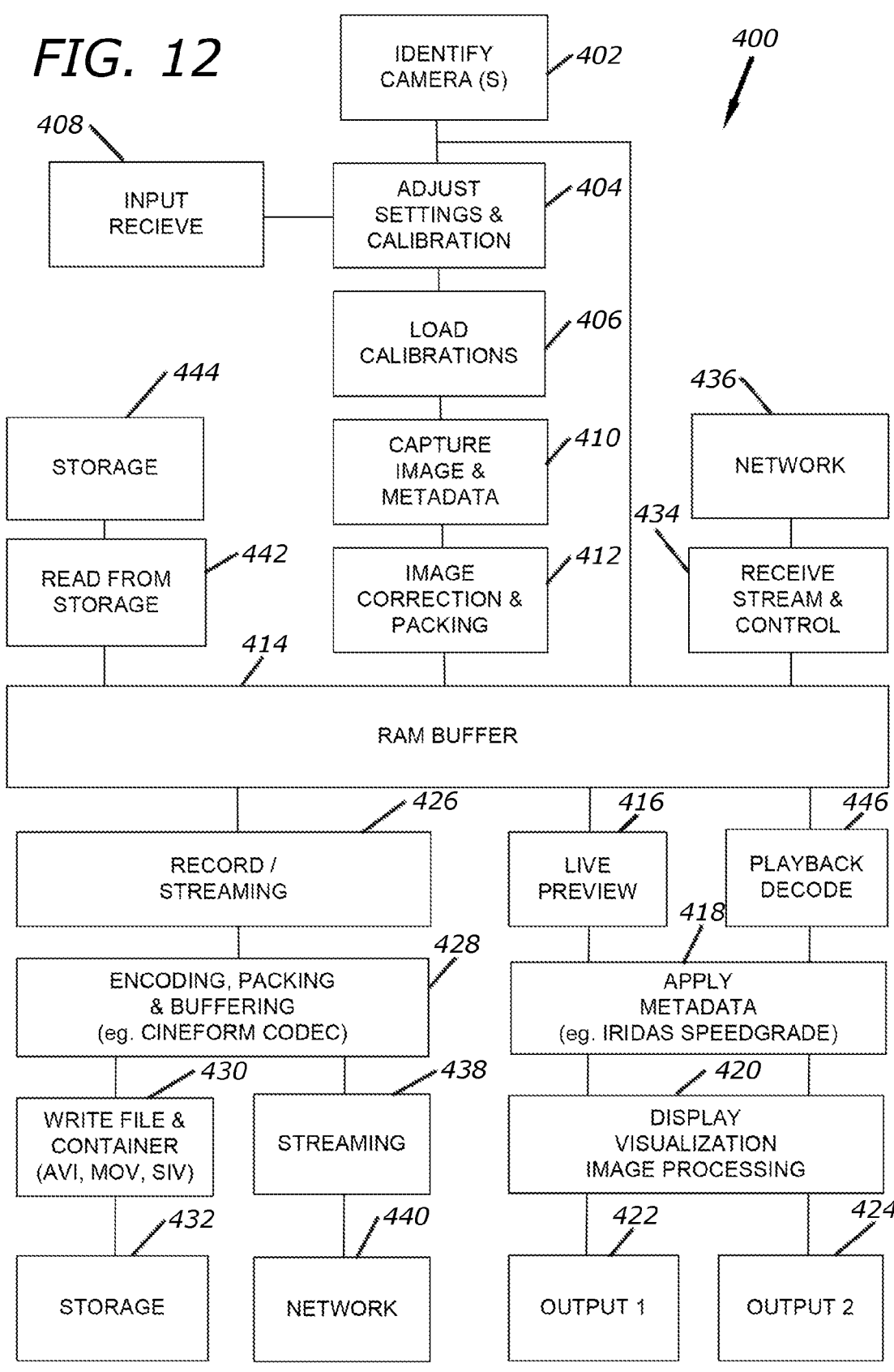
FIG. 12 is a flow chart for SiliconDVR software associated with the present invention.

FIG. 12 illustrates a flow chart 400 for the software 38 described above. The software 38 searches for cameras, including sensor units and camera modules, connected to the acquisition system via a data link, such as network, cameralink and HD-SDI with reverse serial communication and control channel. Once detected, the software identifies the cameras 402 by reading and determines make, model and unique serial number identifier, as well as any metadata stored in the camera or from devices which may be connected, such as sensors, optics, lens control and motion control systems. The software uses then adjusts settings and calibration 404 the unique identifier to load previously generated and stored calibration data for use in the live acquisition video processing software pipeline 406. If the data does not exist, the software can initiate a calibration process to generate new calibration data. The software receives input settings 408 thru the camera hardware or from the software generated user interface, which may be touchscreen controls for adjusting functions such as camera settings, recorder settings, image processing modes, streaming and playback. The software continuously captures images and metadata 410, including audio, external device settings and operator settings. The image is then corrected, using the calibration parameters, including pixel-by-pixel black level correction and defect pixel replacement then packed 412 and placed into a RAM buffer 414 for additional processing. In Live Preview 416, various adjustments represented in the metadata, can be applied to the motion imagery 418 such as white balance, color correction, gamma and three dimensional look-up-tables, such as those generated by tools such as Iridas Speedgrade. Then additional visualization and image processing 420 of the data can be applied such as scaling, zooming, exposure metering, focus enhancing, flipping, keying, guide overlays and stereo mixing. The imagery can then be output to displays. One display may be used for live motion image and operator touchscreen interface 422. Another display can be used for full screen live motion image output with or without overlay or data mixing and alternative visualization and processing 424. In systems with multiple image sources imagery from each source may be output to its own output or mixed for stereo 3D visualization, including driving outputs for mesh projection systems. Display settings such as convergence of dual camera streams can be sent into the recording engine for storage with other metadata. While the live motion image is captured and processed, the software can record and stream the images and metadata 426. Image and metadata captured in the RAM buffer 414 can be accessed for optional encoding, packing and buffering 428 in a first-in-first out basis at a different rate and from a different position of RAM buffer 414 than being accessed by the live preview software engine. The encoding may use Cineform wavelet-based compression engine. The coded or uncoded data can then be written to file in a container format such as Audio Video Interleaved .AVI, Quicktime .MOV or sequence of .DNG or raw images with an extension such as .SIV 430. The file can be written to local or remote storage 432 on a project and auto file sequence naming basis. The file can also be streamed 438 via network 440. For continuous recording, the storage can span multiple storage devices with programmable file size segmentation. The capture or recorded image and data can be retrieved from storage and placed back into the RAM buffer 414 for playback. The playback engine can access the images and metadata from the ram buffer 414 where it can be decoded 446 and unpacked and processed thru the same processing, display visualization and image processing as done during the live process, for display on one or more displays. The playback data may also be combined using image processing and visualization with live image preview images to perform functions such as keying of live action with previously recorded content. The live and playback processing can be done with either single source or multiple sources including stereo playback mixing with live stereo preview. The software reads data 442 from storage 432, 444. The imagery for playback or live preview may also come for another source, streamed 434 via network 436 into the RAM buffer. The recording and streaming engines can also be used for processing of the image processing visualized output content. Although the present invention has been discussed above in connection with use for film and video motion pictures, the present invention is not limited to that environment and may also be used in any environment where digital cameras may be employed including, without limitation, a security camera system, a digital camera system on a robotic vehicle or the like.

Although the present invention has been discussed above in connection with use for film and video motion pictures, the present invention is not limited to that environment and may also be used in any environment where digital cameras may be employed including, without limitation, a security camera system, a digital camera system on a robotic vehicle or the like.

Although several embodiments have been described in detail for purposes of illustration, various modifications may be made without departing from the scope and spirit of the invention.

What is claimed is:

1. A digital camera system, comprising:

(a) an imaging subsystem comprising at least one onboard CMOS color imager camera module having an imager resolution of at least 4K and supporting capturing 10-bit or higher precision data at video rates or higher, including at 59.94FPS or higher, said camera module aligned with an optical assembly comprising at least one of an integrated lens and a mount for an interchangeable lens, wherein the imaging subsystem is configured to capture one or more views of a scene;

(b) a processing subsystem comprising:

(i) a processor comprising dedicated hardware, said dedicated hardware including a video codec engine, wherein said processor and dedicated hardware are configured for real-time stream processing of 10-bit or higher variable bit rate (VBR) video data, said stream processing comprising at least one of encoding or decoding video data formatted as at least one of: (A) a 4K (Quad HD) or higher resolution color-processed video format, including color subsampled formats; and (B) a Cinema 4K or higher resolution raw format comprising a camera recording of encoded raw video data, including preprocessed raw data, encapsulated with associated audio, when present, and camera-captured metadata for generating a fully demosaiced and/or color-adjusted video during playback or editing;

(ii) at least one high-speed communication interface, wherein said at least one high-speed communication interface comprises at least one of: (A) a gigabit or higher rate network interface configured for wired and/or wireless networking; and (B) a high-speed serial interface configured for inputting or outputting at least one of video data, audio, and metadata;

(iii) software stored on a computer-readable storage medium for execution on the processing subsystem for system control, including at least one of capturing, image processing, analyzing, recording, playing back or streaming, visualizing, and networking functions, using at least one of a unified software interface and executing reprogrammable software configured to perform one or more of said functions;

(c) one or more integrated sensors configured to generate data for integration as metadata, said metadata comprising at least one of motion, position, audio, and laser-based distance;

(d) at least one of an on-board display and a display output;

(e) a battery or battery input configured to power the digital camera system;

wherein the processing subsystem is configured by the software to:

(A) capture and process data from the at least one camera module and the one or more integrated sensors, said processing comprising extracting and integrating metadata and performing image and/or stereo processing to generate 10-bit or higher raw and/or color-processed image and/or video data;

(B) encode the processed image and/or video data utilizing the video codec engine and combine the encoded data with associated audio, when present, and the integrated metadata for encapsulated file recording to at least one of an internal or removable storage device, or for streaming over the at least one high-speed communication interface;

(C) decode recorded and/or streamed encoded video data;

(D) generate a visualization in a non-destructive fashion from video content comprising at least one of the processed image and/or video data of step (A) and the decoded video data of step (C), said visualization comprising applying image and color adjustments based on the integrated metadata, wherein said adjustments comprise performing color transformations, including color space transformations, to achieve an accurate and/or dynamic representation of the video content on a scene or frame basis, and wherein the processing is configured for wide dynamic range content representing a wide range of scene intensity and for content formats that exceed SMPTE standards by supporting at least one of HD or higher resolution or a DCI or wider color space, and causing an outputting of associated audio, when present.

2. The digital camera system of claim 1, wherein the processor comprises a multi-core CPU and a GPU, wherein the dedicated hardware further comprises a frame grabber, and wherein the CPU, GPU, and dedicated hardware are configured to access a memory including at least one RAM buffer for data capture, communication, and processing.

3. The digital camera system of claim 2, wherein the dedicated hardware further comprises a massively parallel processor configured as a scalable processor array comprising multiple compute units and memory units, wherein said memory units are configured to stream data to the compute units at a rate of 10 Gigabits per second or higher; and wherein the processing subsystem is configured to use said massively parallel processor, in combination with at least one of the CPU and the GPU, to perform at least one of: (a) image or stereo processing; (b) analysis of image and sensor data to extract metadata; (c) image enhancement and color correction; (d) wide dynamic range processing; (e) noise correction; (f) pattern matching, recognition, or object classification based on the image data; and (g) mixing or generating virtual image content based on metadata.

4. The digital camera system of claim 2, wherein the frame grabber is configured for: (a) capturing and processing data, including raw data and color processing, from at least one camera module configured for transmitting image data and/or metadata over one or more high-speed serialized links (lanes) capable of operating at rates of at least 1.5 Gigabit/sec per link; (b) transmitting and/or receiving communication and/or control signals to and/or from the at least one camera module for configuration, control, and data exchange; and (c) supporting at least one of: (i) 5 Gb/sec or higher channel bandwidth for capturing 10-bit or higher precision 4K (Quad HD) format at 3840×2160 or higher resolution at video rates or higher; and (ii) 10 Gigabit/sec or higher enabling at least one of stereo capture, multi-image capture, and high frame rate capture exceeding 120 fps at HD or higher resolution.

5. The digital camera system of claim 4, wherein the frame grabber is further configured to transmit clock and synchronization signals and/or commands to one or more connected camera modules to operate image sensor timing, including for single and multi-camera operation, and to extract metadata, including timecode, transmitted from the one or more connected camera modules for synchronization of camera streams and/or other streams including audio and further processing.

6. The digital camera system of claim 4, wherein the frame grabber is further configured to perform real-time processing of the captured data prior to or during storage in the RAM buffer, said processing comprising at least one of multi-exposure mixing, noise correction, pixel correction, demosaicing, data packing, and color processing, to generate video data comprising at least one of a raw format and a color-processed video format, including color subsampled formats.

7. The digital camera system of claim 2, wherein the CPU, GPU, and dedicated hardware share access to the memory, and wherein the processing subsystem is further configured to perform a lossless coding of 10-bit or higher video data, including raw and/or color-processed video, during capture and processing to reduce memory bandwidth and/or reduce data transfer requirements between modules, and to subsequently decode said coded data accessed from the at least one RAM buffer for further processing, including for generating a live preview.

8. The digital camera system of claim 2, wherein the processing subsystem is further configured to: (a) continuously capture high-resolution and/or wide dynamic range image and/or video data and metadata from the at least one on-board CMOS color imager camera module and the one or more integrated sensors; (b) process the image data and buffer the processed image data in the RAM buffer; (c) utilize the metadata to adjust the processed image data; (d) output the buffered image data to at least one of the on-board display and the display output for live preview; and (e) upon receiving a trigger or event initiation, select one or more frames from the RAM buffer for recording at a timing or buffer position different than that currently being accessed for the live preview, including adjusting a timing or buffer position of the selected frames relative to the trigger and/or a current imager exposure and shutter readout cycle to enable processing and recording of images captured at or near the event time.

9. The digital camera system of claim 8, wherein the processing subsystem is further configured to retrieve a timed sequence of image frames and associated audio from the RAM buffer corresponding to a time period before, during, and/or after the trigger, and wherein the retrieved frames are encoded to generate a video recording of the timed sequence with the associated audio and metadata.

10. The digital camera system of claim 8, wherein selecting the one or more frames comprises capturing a plurality of image frames with varying exposures from the RAM buffer, and wherein the processing subsystem is further configured to: (a) analyze captured image and/or sensor data to extract metadata; (b) process the captured image frames, using metadata-driven adjustments, to generate a high-resolution Wide Dynamic Range (WDR) image with enhanced details in both bright and dark areas, including processing data derived from at least one of multi-exposure mixing and pixel binning; and (c) encode the WDR image in an image format file supporting 10-bit or higher precision, said file comprising at least one of: (i) a raw image format, said file comprising a visually lossless or near-original compressed format and including comprehensive metadata for flexible and non-destructive image processing, said metadata including at least one of demosaicing, color processing, scene data, exposure, white balance, and color adjustment, and said raw format including a Digital Negative (DNG) format; and (ii) a high-resolution color-processed image format, said file further including depth or distance metadata generated from at least one of stereo processing and a laser distance sensor for applying a visualization effect comprising a depth perception adjustment.

11. The digital camera system of claim 2, wherein the software is further configured to provide, via a unified software interface, a platform for receiving, storing, and executing reprogrammable software to extend or upgrade the functionality of the system, wherein said reprogrammable software is configured to perform at least one of: (a) capturing, encoding, or decoding video and associated metadata; (b) performing metadata-driven visualization during playback or streaming; (c) performing editing, including non-destructive visualization; (d) mixing of live or stored video with real-time 3D rendered graphics; (e) performing adaptive streaming retrieval of content from a network; (f)

performing wireless content reception from a remote device; and (g) enabling management and control of a multi-camera system over a network.

12. The digital camera system of claim 11, wherein the software is further configured to search for and detect connected camera modules and other connected devices, and to dynamically adapt the operation of the digital camera system, including adjusting the execution of the reprogrammable software, configuring the user interface, and/or modifying the image processing pipeline, based on a determined configuration of the digital camera system, including at least one of: (a) a number of connected camera modules; (b) camera module and processing hardware capabilities, including lens or motion control; and (c) connected device capabilities and calibrations, including for an on-board or remote connected display.

13. The digital camera system of claim 11, wherein the unified software interface is configured to enable the reprogrammable software to access the processing subsystem to control at least one of: (a) settings of the at least one on-board camera module, including exposure and readout modes configured to support wide dynamic range image and video capture; (b) at least one position adjustment mechanism to adjust a lens setting or a positioning of the camera module relative to the optical assembly; (c) image processing functions, including at least one of white balance, color correction, and gamma or a look-up table (LUT), applied during capture or playback; (d) visualization modes for at least one of the on-board display and a connected display, including at least one of a live preview, an overlay, and compositing or mixing of multiple image or video sources; (e) the video codec engine configured to perform operations including encoding or decoding raw or color-processed video; (f) the network interface for transmission, including streaming the video content; (g) file system access for retrieval of stored media content files and associated metadata from a local or remote storage device; and (h) image analysis and visualization processing functions supported by a massively parallel processor, including at least one of object detection, tracking, and face recognition.

14. The digital camera system of claim 11, wherein the unified software interface enables user-selection and execution of the reprogrammable software, and wherein said reprogrammable software comprises a camera control application configured to provide the user interface, including a touchscreen interface, for interactive control of capture settings, visualization, image processing, and recording.

15. The digital camera system of claim 1, wherein the at least one on-board CMOS color imager camera module comprises a CMOS imager having an array of color filtered pixels and a processing unit physically integrated with the imager pixel array, wherein the processing unit is configured, responsive to control signals or settings received from the processing subsystem, to: (a) control imager exposure and readout; (b) perform analog-to-digital conversion of pixel photosite values to generate 10-bit or higher precision data; (c) perform preprocessing comprising at least one of multi-exposure mixing, pixel binning, pixel corrections, packing, coding, and generating multiple data streams; (d) buffer the image data; and (e) perform high-speed serialization of image data and metadata for communication with the processing subsystem.

16. The digital camera system of claim 15, wherein the high-speed serialization of image data and metadata is configured for transmission over one or more high-speed serial links, wherein said links are configured to operate at high speed rates of at least 1.5 Gigabit/sec per link to achieve an aggregate channel bandwidth of at least 5.1 Gb/sec for supporting the 4K or higher resolution image data.

17. The digital camera system of claim 16, wherein the at least one camera module comprises integrated serializer logic configured to generate a serialized data stream from the sensor data output; and wherein the one or more high-speed serial links comprise a physical interface utilizing six or fewer signal conductors for transmitting the serialized data stream, or utilizing four or fewer serial links configured to achieve an aggregate bandwidth of 10 Gbit/sec or higher.

18. The digital camera system of claim 15, wherein the at least one camera module is configured to support capturing and outputting image data at scalable resolutions and frame rates within the channel limits of the one or more high-speed serial links, including at least one of: (a) 4K (Quad HD), comprising 3840×2160 or higher resolution at video rates, including 59.94FPS or higher; (b) high frame rates, including 120 fps or higher at HD or higher resolutions; and (c) still images at a resolution exceeding 10 megapixels.

19. The digital camera system of claim 15, wherein the at least one camera module is configured to perform at least one of sensor readout control and pre-processing, said operations comprising at least one of pixel binning, electronic windowing, and multi-exposure data mixing, to output uninterpolated raw data, including at 12-bit or higher precision, to the processing subsystem; and wherein the processing subsystem is configured to process the received data to generate raw or color-processed image or video data encoded as 10-bit or higher data, at a resolution of 4K (Quad HD) or higher, configured to achieve at least one of a zooming function, a wide dynamic range representation, and a high speed readout for reducing motion artifacts during a rolling shutter operation.

20. The digital camera system of claim 15, wherein the integrated processing unit is further configured to simultaneously transmit multiple streams to the processing subsystem, the multiple streams comprising at least one of: (a) multiple streams of preprocessed imager data including at least one stream of raw data for interpolation or demosaic processing; (b) multiple exposures readout during a frame time; and (c) multiple exposure readouts with varying integration from a rolling shutter readout during a frame time at video rates or higher, configured for multi-exposure mixed transmission.

21. The digital camera system of claim 15, wherein the integrated processing unit is further configured to generate wide dynamic range data using at least one of: (a) combining varying exposure pixel array data with different exposure settings, including gain or integration time, in the camera module prior to multi-exposure mixed transmission; and (b) controlling the image sensor during a rolling shutter exposure and readout cycle to perform multiple readouts from the array of pixels, each readout having varying integration times within a single frame time, to generate multi-exposure data and associated metadata for transmission.

22. The digital camera system of claim 15, wherein the at least one camera module comprises a physical interface configured for connecting to the processing subsystem to receive power, timing signals, and bidirectional communication for configuration, control, and data exchange; and wherein the camera module is configured to receive and utilize the timing signals from the processing subsystem to synchronize exposure and readout timing to achieve accurate timing and frame rate to enable audio synchronization and synchronized capture with one or more additional camera modules.

23. The digital camera system of claim 15, wherein the integrated processing unit includes a timing unit for time keeping and is further configured to transmit metadata including timecode along with image data; and wherein the processing subsystem receives the metadata for synchronization of the image stream with other streams, including other imager and/or audio streams.

24. The digital camera system of claim 23, wherein the timecode and/or associated metadata are transmitted together with the image data over the high-speed serial links, said timecode and/or associated metadata being at least one of embedded within the serialized image data stream and transmitted as a separate data stream.

25. The digital camera system of claim 1, further configured as an integrated digital camera system comprising a single on-board camera module connected to the processing subsystem for receiving power, control, and communication, and wherein the processing subsystem is further configured to perform said encapsulated file recording to a removable storage device.

26. The digital camera system of claim 25, wherein the system further comprises an on-board touchscreen display for content visualization and unified software control, wherein the single on-board camera module comprises an integrated lens configured for capturing action or sports scenes; and wherein the processing subsystem is further configured for real-time image stabilization, generating a live preview on the on-board touchscreen display, and high frame rate recording at rates including 120 fps or higher at HD or higher resolutions, and to combine the encoded high frame rate video with metadata for playback at various speeds.

27. The digital camera system of claim 25, further comprising a multi-axis positioning mechanism configured to be controlled by the processing subsystem, wherein the multi-axis positioning mechanism is configured to adjust the orientation of the single on-board camera module, and wherein the processing subsystem is further configured to utilize extracted metadata from the one or more integrated sensors for stabilization and/or positioning control.

28. The digital camera system of claim 25, wherein the single on-board camera module supports at least Cinema 4K (4096×2160) resolution and 12-bit or higher precision at video rates or higher; wherein the optical assembly comprises a mount for an interchangeable lens, said mount configured as a precision mount for receiving the interchangeable lens directly or via an interchangeable lens mount; wherein the processing subsystem further comprises an electronic interface for communicating with at least one of the interchangeable lens and the interchangeable lens mount; and wherein the processing subsystem is further configured to: (a) receive lens setting metadata via the electronic interface and/or control lens operation; (b) process 12-bit or higher raw image data received from the camera module, wherein said processing comprises handling the raw image data as at least one of uninterpolated data and preprocessed data with image processing functions; and (c) output, via the display output configured as a high-speed serial interface, including at least one of HDMI and SDI, a 10-bit or higher, 4K (Quad HD) or higher resolution color-processed video format with synchronized audio and associated metadata.

29. The digital camera system of claim 28, wherein the single on-board camera module is configured to be removably docked with the processing subsystem or detached for remote operation via a wired connection, and wherein the processing subsystem is further configured to transmit power and control signals to the detached camera module and receive image data and metadata from the detached camera module over said wired connection.

30. The digital camera system of claim 28, wherein the precision mount is configured as an interchangeable lens optical interface mounting system comprising a precise mounting surface and locking mechanism for removably connecting a variety of industry standard lenses, including at least one of a PL, Nikon, Canon, or B4 mount; wherein said B4 mount is configured with an integrated optic for adapting lenses designed for three-sensor prism cameras; and wherein the processing subsystem is further configured to integrate the received lens setting metadata with an image data stream for recording and visualization, including during live preview.

31. The digital camera system of claim 28, wherein the digital camera system further comprises an on-board touchscreen display for content visualization and unified software control, and wherein the processing subsystem is further configured to record 12-bit or higher raw image data at 4K or higher resolution to an encapsulated file with raw metadata as at least one of: (a) wide dynamic range raw format still images; and (b) a sequence of raw video frames at a video frame rate, said sequence encoded using a variable bit rate (VBR) compression for visually lossless or near-original representation and encapsulated with associated audio and metadata.

32. The digital camera system of claim 31, further comprising at least one electronic positioning device, controllable by the processing subsystem, configured for adjusting the position of the camera module relative to the optical assembly or mount; wherein the processing subsystem is further configured to capture and analyze image and sensor data, including at least one motion or position sensor, and perform stabilization processing, and wherein the electronic positioning device is controlled to adjust at least one of centering, rotation, and coplanarity of the imager, including during continuous capture of 4K or higher images.

33. The digital camera system of claim 31, wherein the processing subsystem is further configured to perform real-time analysis of captured image data to extract metadata comprising at least one of focus detection, object detection, face or pattern recognition, and tracking data, and to utilize said extracted metadata to control at least one of: (a) an electronic positioning device for adjusting lens focus; (b) a camera setting, including an exposure setting; and (c) an image and color adjustment applied to the image data based on the detected subject or scene, said adjustment including at least one of white balance, color correction, and gamma.

34. The digital camera system of claim 28, wherein the processing subsystem utilizes the video codec engine, configured by the software, to encode the video data into a user-selected format at scalable resolutions and frame rates; wherein said formats comprise at least one of: (a) a 12-bit or higher raw video data format, said format being at least one of uncompressed or a constant quality variable bit rate (VBR) compressed format, wherein said raw video data is recorded with associated raw processing metadata, and wherein synchronized audio is recorded in at least one of an encapsulated file with the raw video data or in a separate file; and (b) a 10-bit or higher color-processed video format, encoded via VBR compression to include 4:4:4 or 4:2:2 sampling; and wherein the processing subsystem is configured to support continuous recording of said selected format at 4K (Quad HD) or higher resolution at film or video rates at a data rate below one Gigabit/sec, or at a higher data rate corresponding to a higher resolution or frame rate within a bandwidth capacity of the storage device.

35. The digital camera system of claim 28, wherein the processing subsystem is further configured to output, via the high-speed serial interface, 12-bit or higher raw video data, said raw data comprising at least one of uninterpolated data or preprocessed data with image processing functions, at Cinema 4K or higher resolution, with synchronized audio and associated metadata, said metadata including at least one of raw format information, camera settings, such as lens, exposure and gains, color adjustment settings, timecode, and triggers for initiating recording on an external processing and recording device; and wherein the raw video data and metadata are configured to enable the external processing and recording device to encode the received raw data using a constant quality variable bit rate (VBR) compression wherein data rates rise dynamically for complex scenes, and to encapsulate the encoded raw data with the metadata and audio into a container file configured for subsequent decoding and editing, including non-destructive visualization based on the metadata, on a remote processing system, wherein said metadata is utilized to process the decoded raw data to generate a fully demosaiced and color-processed video.

36. The digital camera system of claim 1, wherein the processing subsystem is further configured to output, via the display output, wherein said display output is configured as a high-speed serial interface, a 10-bit or higher, 4K (Quad HD) or higher resolution color-processed and subsampled video format, including 4:2:2 or 4:4:4, with synchronized audio and associated metadata, wherein said interface is configured to output the video format to a standard display interface, including at least one of HDMI, SDI, and USB, directly or via a coupled module.

37. The digital camera system of claim 1, wherein the modular imaging subsystem comprises two color imager camera modules, each with 4K or higher resolution and aligned with an optical assembly for capturing immersive stereo views, and wherein the processing subsystem is further configured by the software to: (a) simultaneously capture, control, and process 12-bit or higher image data from the synchronized camera modules, said processing including at least one of demosaic, image correction, and transformation processing, to generate multiple streams of 4K or higher raw processed data; (b) encode the multiple streams representing left and right eye views using a 10-bit or higher VBR codec for simultaneous compressed raw recording of the multiple streams representing left and right eye views into a single encapsulated file to removable storage with synchronized audio and metadata, said metadata including camera/lens settings, calibrations, timecode, and raw processing metadata; and (c) provide unified software control via an on-board touchscreen display for the simultaneous capture, processing, and recording; wherein the encapsulated file is configured with said raw processing metadata to enable a fully demosaiced and stereo 3D color processed video during subsequent playback or editing, including for visualization on VR devices.

38. The digital camera system of claim 1, wherein the processing subsystem is further configured to utilize at least one of (A) the gigabit or higher rate network interface, and (B) an additional processing unit coupled to the system via the display output, to transmit high-resolution video data and associated metadata as a timecode synchronized, low-latency stream over a network for at least one of remote detection, control, and monitoring by a remote processing system.

39. The digital camera system of claim 38, wherein the high-resolution video data transmitted as a low-latency stream comprises a 10-bit or higher, 4K (Quad HD) or higher resolution color-processed video format, including color subsampled formats, with synchronized audio and associated metadata, said video format being at least one of uncompressed and compressed with a visually lossless or near-original representation codec.

40. The digital camera system of claim 1, wherein the gigabit or higher rate network interface is configured for wireless communication, and wherein the processing subsystem is further configured to: (a) stream a live preview over said wireless network interface to a remote mobile device comprising a touchscreen display; and (b) receive control signals from the remote mobile device via said wireless network interface for controlling at least one of a camera setting and the encoding.

41. The digital camera system of claim 1, wherein the processing subsystem is further configured to utilize at least one of timecode information and timing signals received via the gigabit or higher rate network interface or a serial data interface to synchronize at least one of a capture frame rate and a timecode, and to integrate the synchronized metadata with the 10-bit or higher video data.

42. The digital camera system of claim 41, wherein the processing subsystem is further configured to receive external timecode and audio signals via the high-speed serial interface and integrate the audio, including for switching or mixing, and timecode metadata into the synchronized 10-bit or higher video data for at least one of recording and output.

43. The digital camera system of claim 41, wherein the high-speed serial interface comprises a USB interface, and wherein the processing subsystem is further configured to receive the external timecode, synchronization signals for sensor timing, and audio signals from an external input unit connected to said USB interface, said external input unit providing connectivity for receiving said external timecode, synchronization signals, and audio sources and communicating them to the processing subsystem.

44. The digital camera system of claim 1, further configured as a mobile digital camera system, wherein: (a) the imaging subsystem comprises at least two on-board CMOS color imager camera modules, each having a resolution of 4K or higher and aligned with an optical assembly comprising an integrated lens, configured for capturing the one or more views of a scene as at least one of overlapping views, a stereo view, or multiple perspectives; (b) the system comprises a shared housing integrating the at least two camera modules, the processing subsystem, an on-board touchscreen display, and the at least one high-speed communication interface, wherein said interface comprises the gigabit or higher rate network interface, including for wireless network communication with remote devices; and wherein the processing subsystem executes software, including reprogrammable software, configured to provide the user interface on the on-board touchscreen display for unified control, visualization, and networking of data captured from the at least two camera modules, including encoded video and/or sensor data.

45. The digital camera system of claim 44, wherein at least two of the camera modules are configured to capture different views of the scene, comprising at least one of overlapping, different hemispherical, and different perspective views; and wherein the processing subsystem is configured by the software to simultaneously capture video streams from said camera modules, including simultaneous control of exposure settings; to perform image processing to generate color video, including for a real-time visualization on the on-board touchscreen display, comprising at least one of switching, mixing, and stitching the video streams; and to utilize the video codec engine to encode the processed video streams as at least one of a single file and multiple synchronized files combined with associated audio and metadata for enabling a multi-view or immersive representation during subsequent playback or processing.

46. The digital camera system of claim 44, wherein at least two of the plurality of camera modules are configured as a stereo pair with a short inter-ocular distance suitable for handheld shooting, and wherein the processing subsystem is configured by the software to perform synchronized capture and stereo processing on data from the stereo pair to perform at least one of: (a) extracting depth or distance metadata from at least one of image processing and stereo processing; and (b) enabling at least one of switching, mixing, and zooming between video streams from the camera modules in the stereo pair.

47. The digital camera system of claim 46, wherein each of the camera modules in the stereo pair further comprises at least one electronic positioning device, controllable by the processing subsystem, configured for adjusting one or more of: (a) positioning of optical assembly elements for at least one of focus, iris, and alignment; and (b) the relative positions of the imager and/or optics, including for centering and at least one of rotation and back focus adjustment.

48. The digital camera system of claim 46, further comprising at least one additional 4K or higher resolution camera module for capturing an additional view of a scene, the additional view comprising at least one of: (a) a different perspective; (b) a different hemisphere; or (c) a different detection capability based on a different imager sensitivity or lens setting.

49. The digital camera system of claim 48, wherein the at least one additional camera module comprises an optical assembly with at least one of a prism and a mirror for modifying a path of light to an imager, and further comprises at least one electronic positioning mechanism for performing at least one of optical centering, image stabilization, and focus adjustment; and wherein the processing subsystem is configured by the software to control said at least one electronic positioning mechanism.

50. The digital camera system of claim 46, further comprising at least one laser-based distance sensor, and wherein the processing subsystem is further configured to utilize sensor data from the at least one laser-based distance sensor for at least one of: (a) depth or distance metadata extraction; (b) metadata generation for controlling camera settings, including adjusting focus; and (c) enhancing visualization and rendering of 3D graphics.

51. The digital camera system of claim 47, wherein the processing subsystem is configured by the software to utilize motion and position metadata to control at least one of: (a) geometric adjustments to one or more image streams, the geometric adjustments including at least one of translation, rotation, scaling, and warping; and (b) the at least one electronic positioning device of each of the camera modules; wherein said control comprises at least one of: (i) image stabilization for single- or multi-imager operation; (ii) overlap or mixing adjustment; and (iii) inter-ocular distance or convergence processing.

52. The digital camera system of claim 46, further comprising at least one additional stereo pair of imagers and/or sensors configured for an overlapping view of a scene, and wherein the processing subsystem is further configured by the software to process data from the at least one additional stereo pair, including for simultaneous processing of data from at least two imagers and/or sensors of the multiple stereo pairs, and to switch between the multiple stereo sources.

53. The digital camera system of claim 52, wherein the at least one additional stereo pair comprises: (a) at least one color imager camera module; (b) at least one of a monochrome imager and a laser sensor; and (c) a dedicated light source controllable by the software; wherein the processing subsystem is configured by the software for selective or simultaneous synchronized capture with the additional stereo pair for at least one of: (a) image and scene analysis, including face recognition, and generating metadata for system control; (b) generating depth or distance metadata for subsequent use in at least one of a depth perception adjustment and a visualization effect; and (c) capturing a wider range of scene intensity by performing a combined processing of data captured from the at least one color imager camera module and the at least one of a monochrome imager and a laser sensor.

54. The digital camera system of claim 52, wherein the processing subsystem is configured by the software to generate a composite visualization by mixing or compositing a live camera view from at least one of the stereo sources with real-time 3D rendered graphics, wherein the 3D rendered graphics are positioned in the composite visualization based on an analysis of data from the stereo sources to create an illusion of interaction between the live camera view and the 3D rendered graphics.

55. The digital camera system of claim 50, wherein the processing subsystem is further configured to analyze captured image and/or sensor data to extract metadata comprising scene data, said scene data including exposure or scene intensity data and at least one of object detection, face or pattern recognition, and tracking data; and to integrate said metadata with the depth or distance metadata derived from at least one of the stereo processing and the laser-based distance sensor; and to utilize said integrated metadata for at least one of: (a) controlling one or more electronic positioning mechanisms, including for adjusting focus based on the scene data; (b) applying an image processing or visualization effect comprising an adjustment to at least one of depth perception and a focus effect occurring during at least one of live preview and subsequent playback; and (c) encoding content comprising at least one of (i) a 10-bit or higher still image with metadata and (ii) a 10-bit or higher encoded video with audio combined with a metadata stream, for enabling subsequent editing, including non-destructive visualization, comprising modification of said visualization effect based on the associated metadata.

56. The digital camera system of claim 46, wherein the processing subsystem is further configured to perform multi-stream processing of captured stereo 3D video content, said processing comprising performing a stereo processing adjustment of the captured video for at least one of overlap and perspective correction, said adjustment utilizing metadata generated from at least one of image analysis, sensor data, camera settings, and calibrations.

57. The digital camera system of claim 56, wherein the processing subsystem is further configured to utilize the video codec engine to perform encoding of the adjusted stereo 3D video content as dual streams representing left and right eye content, wherein each stream comprises 10-bit or higher video at HD (1920×1080) or higher resolution, said encoding comprising at least one of independent full-frame streams or an interleaved sequence, and wherein the encoded streams are encapsulated with associated audio and metadata into a single container file for 2D or 3D representation during playback.

58. The digital camera system of claim 57, wherein the metadata encapsulated in the single container file includes metadata for depth perception adjustment, said metadata including at least one of: (a) information indicating the presence and format of the multi-view video; (b) identification of individual sources or positions of the camera modules, including as left and right eye sources; (c) metadata representing a geometric relationship of the dual streams, including at least one of inter-ocular distance or convergence metadata; (d) color transformation metadata for the dual streams; and (e) streaming metadata for dynamic adjustments to a stereographic effect during playback.

59. The digital camera system of claim 56, wherein the processing subsystem is further configured to capture and encode a 10-bit or higher stereo still image, wherein said encoding comprises encapsulating synchronized left and right eye image data in a single container file with associated metadata, wherein said metadata comprises stereo configuration metadata including at least one of identification of left and right eye images and relative position data, and wherein said metadata is configured to enable selective display of the stereo still image as either a 2D representation or a 3D stereographic representation with depth perception or stereo effect adjustment based on the metadata.

60. The digital camera system of claim 44, wherein the processing subsystem is further configured to receive external synchronization signals from an external input unit coupled via the at least one high-speed communication interface, said signals comprising at least one of timecode and timing signals; and to utilize said signals to synchronize at least one of a timecode, a capture frame rate, and a sensor readout timing of the digital camera system with one or more external camera systems, thereby enabling synchronized capture in a multiple digital camera system production, including for generating at least one of a recording or a video output comprising the common timecode.

61. The digital camera system of claim 44, wherein the processing subsystem is further configured to generate wide dynamic range (WDR) content by combining image data captured from at least two of the plurality of camera modules, including from modules with varying exposure settings and/or different detection capabilities based on different imager sensitivity or lens settings, and wherein the combining is adjusted based on metadata, comprising at least one of motion data and synchronization information, to minimize motion artifacts.

62. The digital camera system of claim 44, wherein the processing subsystem is further configured to execute a reprogrammable software application for image processing and visualization, wherein said software application configures the processing subsystem for bi-directional communication and to: (a) simultaneously capture video from at least one of the plurality of on-board camera modules and audio from one or more integrated sensors; (b) enable a user to switch the capturing between at least two of the plurality of camera modules, said at least two camera modules configured to capture at least one of a different perspective and a different hemisphere, during the communication; (c) transmit the captured video and audio as a first stream over the at least one high-speed communication interface via wireless communication; (d) simultaneously receive one or more remote streams comprising remote video and audio over said interface; and (e) cause a visualization comprising a mix or composite of the remote video from the one or more remote streams and the captured video, while simultaneously outputting the remote audio.

63. The digital camera system of claim 1, wherein the processing subsystem is further configured to modify the image and color rendering of the content and/or hardware settings of a display based on: (a) metadata representing capabilities and settings of the display, including its colorimetry and intensity; and (b) metadata received with the content; to achieve an accurate color representation of wide dynamic range content representing a DCI or wider color space.

64. The digital camera system of claim 44, wherein the processing subsystem is further configured to transmit encoded video and associated metadata over the at least one high-speed communication interface via wireless communication to a remote display device, wherein the associated metadata includes streaming metadata for dynamic representation on a scene or frame basis, for enabling the remote display device to utilize the transmitted metadata to perform a dynamic representation by adjusting its display settings and/or the rendering of the content.

65. The digital camera system of claim 44, wherein the processing subsystem is further configured to: (a) stream the visualization processed content, with or without a user interface overlay or data mixing, as a video stream over at least one of the high-speed communication interface and the display output to a remote processing system; and (b) receive, from the remote processing system, metadata comprising at least one of user input and device capabilities, for dynamically adjusting the visualization processing.

66. The digital camera system of claim 44, wherein the processing subsystem is further configured to record the visualization processed content, with or without user interface or overlay, as a file comprising at least one of a video and a still image with associated metadata to at least one of an internal and a removable storage device.

67. The digital camera system of claim 1, wherein the processing subsystem is further configured to utilize the video codec engine for encoding and/or decoding of video data at scalable resolutions and frame rates using a 10-bit or higher variable bit rate (VBR) compression, including support for color subsampled formats and 4K (Quad HD) at 3840×2160 or higher resolution at film or video rates at data rates below one Gigabit/sec, and wide dynamic range formats with associated metadata for representing a wider range of intensity and/or color encompassing at least DCI or wider color.

68. The digital camera system of claim 67, wherein the video codec engine is configured by the software to enable user selection of compression methods and formats for recording and/or streaming, including a selection between at least one of a raw video format and a color-processed video format.

69. The digital camera system of claim 67, wherein the processing subsystem is further configured to process the wide dynamic range content representing a wide range of scene intensity by applying image and color adjustments, including a gamma adjustment, to the video data prior to encoding; and to embed metadata representing the adjustments, said metadata configured for applying adjustments, including at least one of a gamma correction or a Look-Up Table (LUT), for visualization during playback.

70. The digital camera system of claim 67, wherein the encoding and/or decoding further comprises processing raw or color video data using the 10-bit or higher variable bit rate (VBR) format for achieving a visually lossless or near-original representation; wherein the encoded video content comprises at least one of (a) 4K (Quad HD) or higher resolution color processed video in a 4:2:2 or 4:4:4 format and (b) Cinema 4K or higher resolution 12-bit or higher raw video formats comprising a camera recording of encoded raw video data, including preprocessed raw data, at high frame rate formats, comprising 59.94FPS or higher; and wherein the processing subsystem is further configured to combine the encoded video content with synchronized audio and associated camera-captured metadata, including at least one of camera settings, lens settings, scene data, and sensor data, and encapsulate the combined content into an encapsulated container file, including QuickTime (.MOV) or a proprietary container format, for recording to at least one of an internal and a removable storage device.

71. The digital camera system of claim 70, wherein the at least one high-speed serial interface comprises a USB interface or high-speed serial interface configured for bi-directional communication, and wherein the processing subsystem is further configured to output the encapsulated container file directly to an external portable storage device connected via said interface for recording, while providing a simultaneous live preview on the on-board display.

72. The digital camera system of claim 70, wherein the raw video formats of prong (b) comprise 12-bit or higher raw video data, including at least one of uninterpolated data and preprocessed data with image processing functions, with synchronized audio and associated metadata, said metadata including at least one of camera settings, such as lens, exposure and gains, and color adjustment settings, timecode, and raw format information for generating a fully demosaiced and color-processed video.

73. The digital camera system of claim 72, wherein the encoding of the raw video data comprises a method wherein compressed data rates rise dynamically for more complex scenes for achieving constant quality and/or minimized visual artifacts when decoded, and wherein the encapsulated container file is configured with associated audio and metadata comprising raw processing metadata for enabling a fully demosaiced and color-processed video during playback and subsequent editing of the encapsulated file, including non-destructive visualization, in a separate software application.

74. The digital camera system of claim 70, wherein the processing subsystem is further configured to store processing adjustment metadata for the encoded raw or color processed video data in at least one of an encapsulated file with the encoded video data and an associated metadata file, said metadata representing color grading parameters including at least one of a white balance, color correction, gamma, or a three-dimensional look-up-table, and enabling non-destructive processing during playback or editing.

75. The digital camera system of claim 67, wherein the processing subsystem is further configured to analyze video data during capture to generate metadata, including streaming metadata, comprising scene data representing a range of scene intensity, and to combine said metadata with the encoded video data for enabling a dynamic representation and rendering of wide dynamic range content on a scene or frame basis.

76. The digital camera system of claim 67, wherein the processing subsystem is further configured to perform simultaneous encoding of at least one high-quality stream for recording and at least one additional stream at a lower data rate and/or reduced resolution for at least one of live streaming, remote monitoring, or network transmission to a remote server for networked collaboration, including editing.

77. The digital camera system of claim 67, wherein the processing subsystem is further configured to capture and simultaneously record synchronized audio in a separate file from the raw or color-processed video data, while maintaining synchronization via common timecode metadata derived from an internal clock or an external timecode source.

78. The digital camera system of claim 67, wherein the processing subsystem is further configured to encode 10-bit or higher high frame rate video, including at HD or higher resolutions at 120 fps or higher, and to combine the encoded high frame rate video with metadata, including format and frame rate settings, for subsequent playback at various lower speeds, including video or film rates, including to achieve an over-cranking effect.

79. The digital camera system of claim 70, wherein the video codec engine is further configured for encoding the 12-bit or higher raw video data of prong (b) utilizing a wavelet-based compression method to achieve visually lossless quality or near-original quality.

80. The digital camera system of claim 67, wherein the video codec engine is further configured for real-time stream processing comprising at least one of encoding or decoding of stereo 3D content encapsulated in a single container file with synchronized audio and associated metadata, said content comprising at least two 10-bit or higher variable bit rate (VBR) image streams, each with HD (1920×1080) or higher resolution, and wherein said processing subsystem is further configured to utilize said metadata for at least one of: (a) decoding and rendering at least one of the image streams for a 2D representation on the on-board display; (b) decoding the dual streams for a 3D representation for output via the display output to a connected stereoscopic display device, including dynamically adjusting at least one of depth perception and stereo effect based on the content metadata, user input, and sensor metadata received from the connected stereoscopic display device; and (c) encoding the stereo 3D content with the associated metadata to enable wireless streaming or network transmission to a remote processing and stereo display system for visualization with said dynamic adjustment.

81. The digital camera system of claim 1, wherein the processing subsystem is further configured to utilize a combination of metadata to make at least one of image adjustments, color adjustments, and display settings adjustments on a scene or frame basis during at least one of live preview and playback, said metadata including at least one of scene data, streaming metadata, and determined device capabilities, including display characteristics.

82. The digital camera system of claim 81, wherein the processing subsystem is further configured to perform image and color adjustments to dynamically adjust the visualized output by: (a) determining a color transformation based on a combination of (i) metadata received with the encoded content and (ii) metadata representing display characteristics of the system, including its intensity and colorimetry; and (b) applying said color transformation, including a color space transformation for representing a DCI or wider color space, during rendering and/or modifying a display hardware setting.

83. The digital camera system of claim 82, wherein applying said color transformation comprises performing adjustments represented in the metadata, including from a streaming metadata source associated with the content for applying a color grade on a scene or frame basis, to achieve a wide dynamic range and color representation, said adjustments including at least one of white balance adjustment, color correction, gamma adjustment, and applying a Look-Up Table (LUT) or 3D LUT to map the content data to the display's intensity or colorimetry.

84. The digital camera system of claim 82, wherein the processing subsystem is further configured to perform mixing or switching of video content from different sources, said sources including content in a standard broadcast color space and wide dynamic range content representing a DCI or wider color space, and to apply color transformations to the content from each source based on metadata associated with that source to generate a composite visualization for a unified rendered output.

85. The digital camera system of claim 82, wherein the processing subsystem is further configured to utilize the video codec engine to perform decoding of a 10-bit or higher, variable bit rate (VBR) video format received from at least one of a network stream and a local file, said format representing a wide range of scene intensity and a DCI or wider color space, and wherein said format includes the streaming metadata, carried within at least one of file headers, groups of pictures (GOPs), or the encoded data, for performing said dynamic representation on a scene or frame basis.

86. The digital camera system of claim 81, wherein the processing subsystem is further configured to execute a reprogrammable software application for playback and image processing of camera captured or post-produced content from local storage or remote storage over the network, wherein said software application configures the processing subsystem to: (a) provide the user interface for interactive control of visualization during playback or streaming; and (b) operate in a client-server configuration to request and receive the encoded content from a remote server via the network interface, including for network streaming.

87. The digital camera system of claim 86, wherein said software application configures the processing subsystem to perform the request and receipt of the encoded content by performing a dynamic retrieval of one of a plurality of alternative representations of the content available from the remote server at different data rates, and to stream said retrieved content, comprising encoded video, audio, and associated metadata, into a RAM buffer; and wherein the video codec engine is configured to access and decode the content from the RAM buffer for visualization, including for performing a dynamic representation of high resolution, wide dynamic range content based on applying adjustments, including at least one of color grading and a color transformation, represented in the received metadata stream on a frame or scene basis.

88. The digital camera system of claim 86, wherein said software application configures the processing subsystem to request and receive one or more files from the remote server for storage on the local storage device, and to enable subsequent playback by retrieving the locally stored files for visualization processing and rendering, including utilizing the associated metadata received with the content for adjustment for the on-board or connected display.

89. The digital camera system of claim 86, wherein said software application configures the processing subsystem to request and receive content from one or more remote servers, comprising live or post-produced video content and advertisement content comprising at least one of video, imagery, and graphics; and to perform visualization processing including an advertisement insertion during the playback or streaming, said insertion comprising generating a visualization by at least one of: (a) switching from the encoded content to the advertisement content; and (b) mixing or compositing the advertisement content with the encoded content, including as a graphical overlay configured for user interaction.

90. The digital camera system of claim 44, wherein the processing subsystem is further configured to execute a camera control application for multi-camera live production, wherein said camera control application configures the processing subsystem to: (a) provide a unified touchscreen user interface to connect to one or more remote mobile camera systems using said wireless network communication; (b) receive and display a view on the on-board touchscreen display comprising one or more video streams from the remote camera systems; and (c) upon receiving an event trigger, transmit control signals to initiate a synchronized recording on at least one of the remote mobile camera systems and the system itself.

91. The digital camera system of claim 90, wherein said camera control application configures the processing subsystem to simultaneously capture and process a local video stream from the at least one on-board camera module, and to provide touchscreen control of a camera or lens setting for said local video stream; and to perform at least one of mixing and switching said local video stream into the view on the on-board touchscreen display for simultaneous or selective visualization with the one or more video streams from the remote camera systems.

92. The digital camera system of claim 90, wherein said camera control application configures the processing subsystem to receive streaming metadata from the remote camera systems, said metadata comprising at least one of audio levels, timecode, and recording status, and to display said metadata on the on-board touchscreen display; and wherein the control signals are for adjusting at least one of an exposure, a focus, and a selection of a specific camera module on a remote camera system.

93. The digital camera system of claim 90, wherein the one or more video streams received by the system for the view of element (b) comprise additional streams having a lower data rate than a high-quality video stream recorded locally on the remote mobile camera systems, wherein said high-quality video stream comprises the 10-bit or higher VBR video data, and wherein said camera control application configures the processing subsystem to receive said additional streams simultaneously with the synchronized recording.

94. The digital camera system of claim 93, wherein said camera control application configures the processing subsystem to request and receive the high-quality video recorded content files, including for the 10-bit or higher VBR encoded, 4K (Quad HD) or higher content, from the plurality of remote mobile camera systems, wherein said files are transmitted via the wireless network communication for collection, storage, and enabling subsequent synchronized multi-stream editing on the digital camera system.

95. The digital camera system of claim 44, wherein the processing subsystem is further configured to execute a reprogrammable software application for editing, wherein said software application configures the processing subsystem to: (a) retrieve one or more encapsulated files containing video data with associated metadata from at least one of a local storage device and a network source, wherein said video data comprises content captured by at least one of the digital camera system and a remote camera system; (b) generate a real-time preview of the decoded video content for non-destructive visualization on the on-board touch-screen display based on an integration of content metadata and device settings, including user-initiated adjustments; and (c) render the edited video content utilizing the video codec engine to generate and store a modified content file comprising the rendered video content combined with associated metadata, including support for at least one of a 4K (Quad HD) or higher resolution format and a wide dynamic range format.

96. The digital camera system of claim 95, wherein the video data comprises a 10-bit or higher variable bit rate (VBR) format for achieving a visually lossless or near-original representation, said format being at scalable resolutions, comprising 4K (Quad HD) or higher; wherein the video data comprises at least one of (a) a color processed video in a 4:2:2 or 4:4:4 format and (b) a 12-bit or higher raw video format.

97. The digital camera system of claim 96, wherein the video data retrieved for decoding comprises the 12-bit or higher raw video format originating from the remote camera system, including support for Cinema 4K or higher resolution, and wherein said software application configures the processing subsystem to utilize metadata generated during an initial capture by the remote camera system to generate a fully demosaiced and color-processed video for at least one of the real-time preview and the rendered modified content file.

98. The digital camera system of claim 97, wherein the raw video format comprises uninterpolated image data encoded with a constant quality variable bit rate (VBR) algorithm, wherein compressed data rates rise dynamically for more complex scenes for achieving constant quality and/or minimized visual artifacts when decoded; and wherein said software application configures the processing subsystem to retrieve and unpack the encapsulated content from a QuickTime container file comprising the compressed raw video data, synchronized audio, and the associated metadata; and to utilize the video codec engine to decode said raw video format and utilize the associated metadata to perform interpolation and colorization of the decoded raw data to generate the fully demosaiced and color-processed video at 10-bit or higher precision, including for 4K (Quad HD) or higher resolutions and wide dynamic range content formats.

99. The digital camera system of claim 98, wherein said software application configures the processing subsystem to utilize reprogrammable software modules to implement selectable or camera-specific algorithms for processing and colorizing the raw video data; and to apply adjustments based on the camera-captured metadata, said adjustments comprising at least one of demosaicing, white balance, color conversion, noise correction, and Look-Up Tables (LUTs).

100. The digital camera system of claim 95, wherein the video data comprises a 10-bit or higher wide dynamic range format representing a range of scene intensity combined with synchronized audio and an integrated metadata stream comprising depth or distance data and at least one of object detection, face recognition, and tracking data; and wherein said software application configures the processing subsystem to apply the user-initiated adjustments by modifying the metadata stream to adjust at least one of a depth perception adjustment and a focus effect; and to render the content with the adjusted effect for at least one of a real-time preview, an update to the metadata in the file, and an encoding of the adjusted content.

101. The digital camera system of claim 95, wherein the video data comprises 10-bit or higher variable bit rate (VBR) stereo 3D content encapsulated in a single container file with synchronized audio and associated metadata, said content containing multiple video streams representing left and right eye views at HD or higher resolution; and wherein said software application configures the processing subsystem to render a 2D representation of the stereo 3D content on the on-board touchscreen display to enable interactive editing; and to generate the modified content file preserving the 10-bit or higher VBR stereo 3D format of the video streams.

102. The digital camera system of claim 95, wherein said software application configures the processing subsystem to operate in a calibrated display mode established via a device setting, said mode utilizing a stored calibrated display profile; and wherein said software application configures the processing subsystem to achieve an accurate representation of wide dynamic range content representing a DCI or wider color space by performing at least one of: (a) applying a color transformation based on the calibrated display profile to the video data during the real-time preview on the on-board touchscreen display; and (b) modifying hardware settings of the on-board touchscreen display based on the calibrated display profile.

103. The digital camera system of claim 102, wherein said software application configures the processing subsystem to record the encoded video combined with metadata comprising color transformation and display settings, including for representing display characteristics defined by the loaded calibrated display profile, including for intensity and colorimetry adjustment, into the generated modified content file for enabling accurate color representation during subsequent playback or streaming.

104. The digital camera system of claim 44, wherein the processing subsystem is further configured to execute a software application for content management, wherein said software application configures the processing subsystem to: (a) provide a user interface on the on-board touchscreen display for interactive control of a workflow comprising at least one of decoding, visualization, editing, and management of stored media content files; and (b) utilize the network interface to transmit the media content files, comprising at least one of encoded video and still image data and associated metadata, wherein said metadata comprises at least one of project setting files and modification metadata, to one or more remote servers for enabling distributed processing, including at least one of remote storage, networked collaboration, and subsequent transmission to a plurality of remote processing and display devices.

105. The digital camera system of claim 104, wherein said software application configures the processing subsystem to generate the media content files by selecting at least one camera module for capturing image or video data, and performing a live capture and visualization processing; wherein said processing comprises applying adjustments in real-time during the live capture, said adjustments being user-controlled or metadata-driven based on an analysis of the image data, and including at least one of an image or color adjustment, a graphical overlay, and a compositing of the data with other visual content; and to encode the adjusted content for at least one of further editing and immediate transmission to the one or more remote servers.

106. The digital camera system of claim 104, wherein said software application configures the processing subsystem to select media content files retrieved from the storage device, including files comprising 10-bit or higher variable bit rate (VBR) encoded 4K (Quad HD) or higher resolution color-processed video; to utilize the video codec engine to decode and process said video data by applying user-controlled adjustments during visualization, said adjustments including at least one of an image or color adjustment, a graphical overlay, and a compositing with other visual content; and to encode the processed content into a file format for transmission to the one or more remote servers, including for subsequent streaming.

107. The digital camera system of claim 104, wherein said software application configures the processing subsystem to perform a collaborative workflow comprising: (a) transmitting modification metadata representing editing operations to the one or more remote servers to effect changes on content stored on the remote servers; and (b) receiving synchronization metadata or media data from the remote servers, said data reflecting editing operations performed by another processing system, to update the media content files stored on the mobile device.

108. The digital camera system of claim 107, wherein the media data received from the remote server comprises a lower-data-rate version derived from the transmitted media content files to enable adaptive editing; and wherein said software application configures the processing subsystem to perform editing operations on said lower-data-rate version and to transmit modification metadata to the remote server to effect changes on the transmitted media content files.

\* \* \* \* \*